US011470311B2

(12) United States Patent
Ramamurthy et al.

(10) Patent No.: US 11,470,311 B2
(45) Date of Patent: *Oct. 11, 2022

(54) REGION SPECIFIC ENCODING AND SAO-SENSITIVE-SLICE-WIDTH-ADAPTATION FOR IMPROVED-QUALITY HEVC ENCODING

(71) Applicant: ARRIS Enterprises LLC, Suwanee, GA (US)

(72) Inventors: Shailesh Ramamurthy, Bengaluru (IN); Padmassri Chandrashekar, Bangalore (IN); Anil Kumar Nellore, Bangalore (IN)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/099,012

(22) Filed: Nov. 16, 2020

(65) Prior Publication Data

US 2021/0067778 A1  Mar. 4, 2021

Related U.S. Application Data

(63) Continuation of application No. 15/648,984, filed on Jul. 13, 2017, now Pat. No. 10,841,581.

(Continued)

(51) Int. Cl.
*H04N 19/117* (2014.01)
*H04N 19/119* (2014.01)
(Continued)

(52) U.S. Cl.
CPC ......... *H04N 19/119* (2014.11); *H04N 19/124* (2014.11); *H04N 19/14* (2014.11);
(Continued)

(58) Field of Classification Search
CPC .... H04N 19/119; H04N 19/124; H04N 19/14; H04N 19/172; H04N 19/436; H04N 19/82

See application file for complete search history.

(56) References Cited

U.S. PATENT DOCUMENTS 6,259,823 B1 * 7/2001 Lee ...................... H04N 19/527
382/268
9,014,265 B1 * 4/2015 Rintaluoma ......... H04N 19/176
375/240.18

(Continued)

OTHER PUBLICATIONS

Ofer Laor, "Algolith Mosquito Video Noise Reducer", Secrets of Home Theater and High Fidelity, http://hometheaterhifi.com, Mar. 2005.

*Primary Examiner* — James T Boylan
(74) *Attorney, Agent, or Firm* — Chernoff, Vilhauer, McClung & Stenzel, LLP

(57) ABSTRACT

A method provides for encoding a frame of video using an edge map made up of one or more edge-blocks detected in the frame. When the edge-blocks are contiguous, at least one slice partition is formed using the edge-blocks and the slice partition is encoded using a sample adaptive offset (SAO) filter, wherein the slice partition is formed with an adaptive slice width, and the sample adaptive offset (SAO) filter is turned on or off during the encoding based on whether the edge-blocks are being encoded. When the edge-blocks are not contiguous, edge-block processing is performed around edges in the frame during encoding of the edge-blocks. The edge-block processing involves configuring one or more of: an intra block size, a transform block size, an inter prediction block size, a quantization parameter, candidate modes for (Continued)

intra prediction, pyramid level for motion estimation, and fractional pixel motion estimation search.

10 Claims, 25 Drawing Sheets

Related U.S. Application Data

(60) Provisional application No. 62/362,168, filed on Jul. 14, 2016.

(51) Int. Cl.
*H04N 19/124* (2014.01)
*H04N 19/172* (2014.01)
*H04N 19/14* (2014.01)
*H04N 19/82* (2014.01)
*H04N 19/436* (2014.01)

(52) U.S. Cl.
CPC ......... *H04N 19/172* (2014.11); *H04N 19/436* (2014.11); *H04N 19/82* (2014.11)

(56) References Cited

U.S. PATENT DOCUMENTS

| | | |
|---|---|---|
| 2005/0091311 A1 | 4/2005 | Lund et al. |
| 2006/0110065 A1 | 5/2006 | Huang et al. |
| 2008/0150217 A1* | 6/2008 | Koga ................... B65H 1/266 271/9.01 |
| 2009/0148062 A1 | 6/2009 | Gabso et al. |
| 2010/0002951 A1 | 1/2010 | Zhai et al. |
| 2011/0058609 A1 | 3/2011 | Chaudhury et al. |
| 2012/0281754 A1 | 11/2012 | Sato |
| 2014/0321552 A1 | 10/2014 | He et al. |
| 2015/0010052 A1 | 1/2015 | Mody et al. |
| 2015/0124869 A1* | 5/2015 | Fu ........................ H04N 19/192 375/240.02 |
| 2015/0172678 A1* | 6/2015 | Alshina ................ H04N 19/117 375/240.02 |
| 2017/0077414 A1 | 3/2017 | Kim et al. |
| 2017/0310983 A1 | 10/2017 | Gudumasu et al. |
| 2018/0184128 A1 | 6/2018 | Chen et al. |
| 2018/0213233 A1 | 7/2018 | Koo et al. |

* cited by examiner sao_eo_class=0 sao_eo_class=1 sao_eo_class=2 sao_eo_class=3

| EdgeIdx | Condition | Meaning |
|---|---|---|
| 0 | p=n0 and p=n1 | flat area |
| 1 | p<n0 and p<n1 | local min |
| 2 | p<n0 and p=n1 or p<n1 and p=n0 | edge |
| 3 | p>n0 and p=n1 or p>n1 and p=n0 | edge |
| 4 | n>n0 and p>n1 | local max |

FIG. 16

|   | 1 | 2 | 3 | 4 | 5 | 6 | 7 | 8 | 9 | 10 | 11 | 12 | 13 | 14 |
|---|---|---|---|---|---|---|---|---|---|----|----|----|----|----|
| 1 | N | N | E | N | N | N | N | E | E | N  | N  | E  | E  | E  |
| 2 | E | N | E | E | N | N | E | N | E | N  | E  | N  | E  | E  |
| 3 | N | E | E | E | N | N | E | N | N | N  | N  | N  | E  | E  |
| 4 | E | E | E | E | E | E | E | E | E | E  | E  | E  | E  | E  |
| 5 | E | E | E | E | E | E | E | E | E | E  | E  | E  | E  | E  |
| 6 | E | E | E | E | E | E | E | E | E | E  | E  | E  | E  | E  |
| 7 | E | E | E | E | E | E | E | E | E | E  | E  | E  | E  | E  |
| 8 | N | E | E | N | N | E | N | N | E | E  | N  | E  | N  | E  |
| 9 | E | N | N | E | N | E | N | N | N | N  | N  | N  | N  | E  |

FIG. 21

REGION SPECIFIC ENCODING AND SAO-SENSITIVE-SLICE-WIDTH-ADAPTATION FOR IMPROVED-QUALITY HEVC ENCODING

CROSS-REFERENCE TO RELATED APPLICATION

This application is a continuation of U.S. patent application Ser. No. 15/648,984 filed Jul. 13, 2017, which claims benefit of U.S. Provisional Patent Application No. 62/362,168, filed Jul. 14, 2016, by Shailesh Ramamurthy, Padmassri Chandrashekar and Anilkumar Nellore, and entitled "REGION SPECIFIC ENCODING AND SAO-SENSITIVE-SLICE-WIDTH-ADAPTATION FOR IMPROVED-QUALITY HEVC ENCODING," which applications are hereby incorporated by reference herein.

BACKGROUND

1. Field of the Invention

The present invention relates to systems and methods for encoding video data, and in particular to a system for region-specific encoding and sample adaptive offset (SAO) sensitive slice-width-adaptation for improved-quality high efficiency video coding (HEVC) encoding.

2. Description of the Related Art

Block-based hybrid video encoding schemes such as high efficiency video coding (HEVC) achieve compression not only by removing redundant information from the bitstream, but also by making adjustments in the quality of the output bitstream. While such quality compromises render HEVC an inherently lossy process, such compromises may be made in a minimally perceptible way. The quality of the output bitstream may be controlled by varying a number of parameters used in the encoding process.

Unless encoders use modeling of human visual system (HVS) to differentiate between different parts of a scene content, the encoder quality would be typically found wanting. If the quality of a reference (which could be a reference frame in non-scalable encoding or a reference frame from a previous layer for scalable coding) is not improved using guidance from HVS, the subsequent coded portions of the bitstream would show areas of opportunity for optimization.

For example, some pixels could be part of edges or textures. Typically, quantization as decided by a naïve rate control may make regions having texture and/or edges suffer from a loss of detail. Coarse quantization in general reduces high frequency information, which is important for edges or textures, and this has a ripple effect when sub-optimally coded edges/textures are used as a reference in intra or inter predictions, or in scalable coding.

It is also important to be aware of moving versus static edges/textures during the coding process. Moving edges with compression artifacts give rise to mosquito noise, which is annoying in terms of perceptual video quality.

Accordingly, there is a need for improved region-specific encoding. This need is met by the methods and systems discussed below.

SUMMARY

To address the requirements described above, the present invention discloses methods for encoding a frame of video.

In one embodiment, the method comprises detecting an edge map comprised of one or more edge-blocks in the frame. The edge map is detected by an edge operator. The edge map is detected by classification of pixels in the frame as edges or non-edges, and by classification of blocks as edge-blocks or non-edge-blocks based on the classification of the pixels. Specifically, the edge map is detected by a gradient or differences computation in a pixel domain of the frame, wherein a lower threshold and a higher threshold are used on the gradient or differences computation in order to generate the edge map, wherein the lower threshold and the higher threshold are used on a number of edge pixels per individual block to classify the individual block as one of the edge-blocks or one of the non-edge-blocks, and wherein the lower and higher threshold are scaled based on the individual block's size used during the encoding for decisions within the individual block.

The method also comprises, when the edge-blocks are contiguous, forming at least one slice partition using the edge-blocks and encoding the slice partition using a sample adaptive offset (SAO) filter. The slice partition is formed with an adaptive slice width, and the sample adaptive offset (SAO) filter is turned on or off during the encoding based on whether the edge-blocks are being encoded.

In addition, the method comprises, when the edge-blocks are not contiguous, performing edge-block processing around edges in the frame during encoding of the edge-blocks. The edge-block processing involves configuring one or more of: an intra block size, a transform block size, an inter prediction block size, a quantization parameter, candidate modes for intra prediction, pyramid level for motion estimation, and fractional pixel motion estimation search.

In another embodiment, the method comprises detecting an edge map in the frame, wherein the edge map is detected using one or more edge operators.

The method also comprises choosing a slice width for a slice of the image, based on the detected edge map.

In addition, the method comprises selectively turning a sample adaptive offset (SAO) filter on or off for the slice at the chosen slice width, based on the detected edge map.

The edge map contains one or more blocks containing edges, and edge-block processing is performed dynamically during encoding of the edge-blocks by configuring for: smaller prediction block sizes around edges for intra; smaller transform unit sizes around edges for intra or inter; improved quantization parameter (QP) and smaller block sizes for edge-blocks that will be used as references for intra or inter; improved prediction by more intense sub-pixel motion estimation (ME); and motion vectors (MVs) of panned regions showing many adjacent blocks having nearly the same motion vectors, wherein a global motion vector is used to detect panned regions.

Still another embodiment is evidenced by an apparatus having a processor for performing the foregoing methods.

BRIEF DESCRIPTION OF THE DRAWINGS

Referring now to the drawings in which like reference numbers represent corresponding parts throughout:

FIG. 16 illustrates how a sample is classified into one of five categories;

FIG. 21 is an example edge map, based on FIG. 20, that shows different arrangements and orientations of edge blocks and non-edge blocks in a frame;

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

HEVC Summary

Audio-Visual Information Transception and Storage

Figure 1:
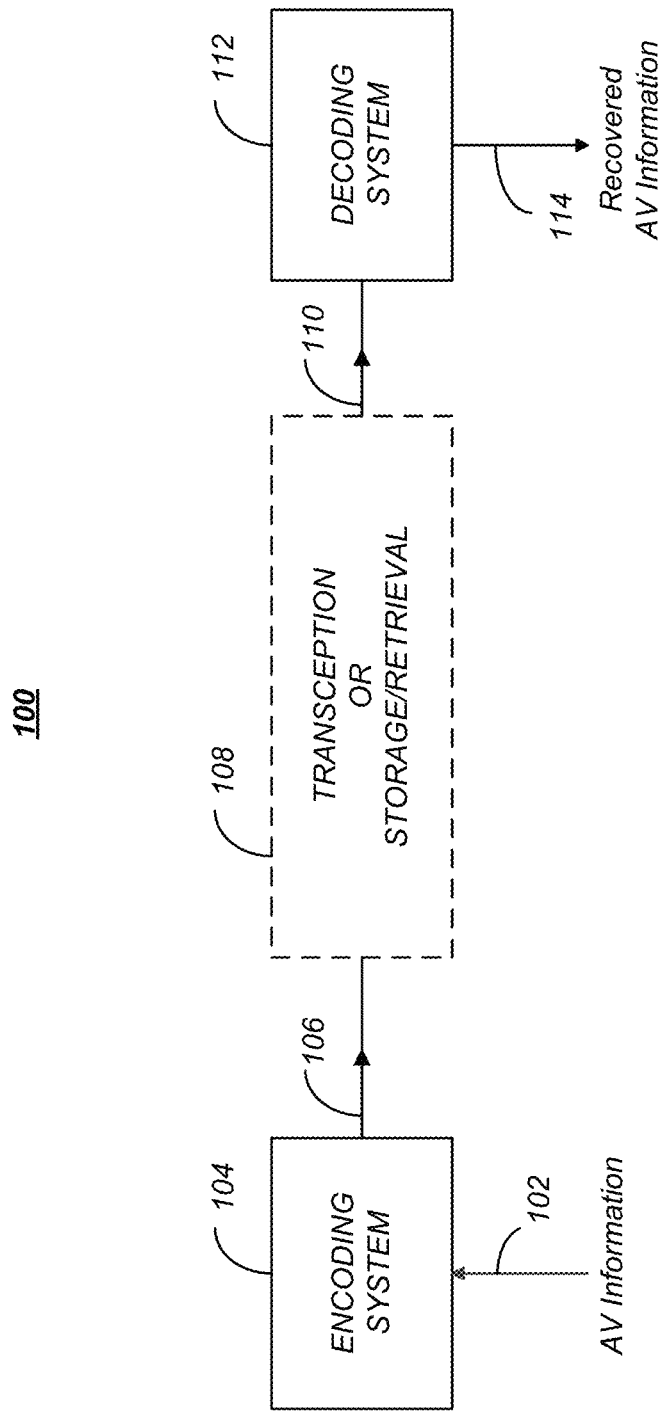
FIG. 1 is a diagram depicting an exemplary embodiment of a video coding-decoding system that can be used for transmission and/or storage and retrieval of audio and/or video information.

FIG. 1 is a diagram depicting an exemplary embodiment of a video coding-decoding (codec) system 100 that can be used for transmission and/or storage and retrieval of audio and/or video information. The codec system 100 comprises an encoding system 104, which accepts audio-visual (AV) information 102 (also referred to hereinafter as uncoded video) and processes the AV information 102 to generate encoded (compressed) AV information 106, and a decoding system 112, which processes the encoded AV information 106 to produce recovered AV information 114. Since the encoding and decoding processes are not lossless, the recovered AV information 114 is not identical to the initial AV information 102, but with judicious selection of the encoding processes and parameters, the differences between the recovered AV information 114 and the unprocessed AV information 102 are acceptable to human perception.

The encoded AV information 106 is typically transmitted or stored and retrieved before decoding and presentation, as performed by transception (transmission and reception) or storage/retrieval system 108. Transception losses may be significant, but storage/retrieval losses are typically minimal or non-existent, hence, the transcepted AV information 110 provided to the decoding system 112 is typically the same as or substantially the same as the encoded AV information 106.

Figure 2A:
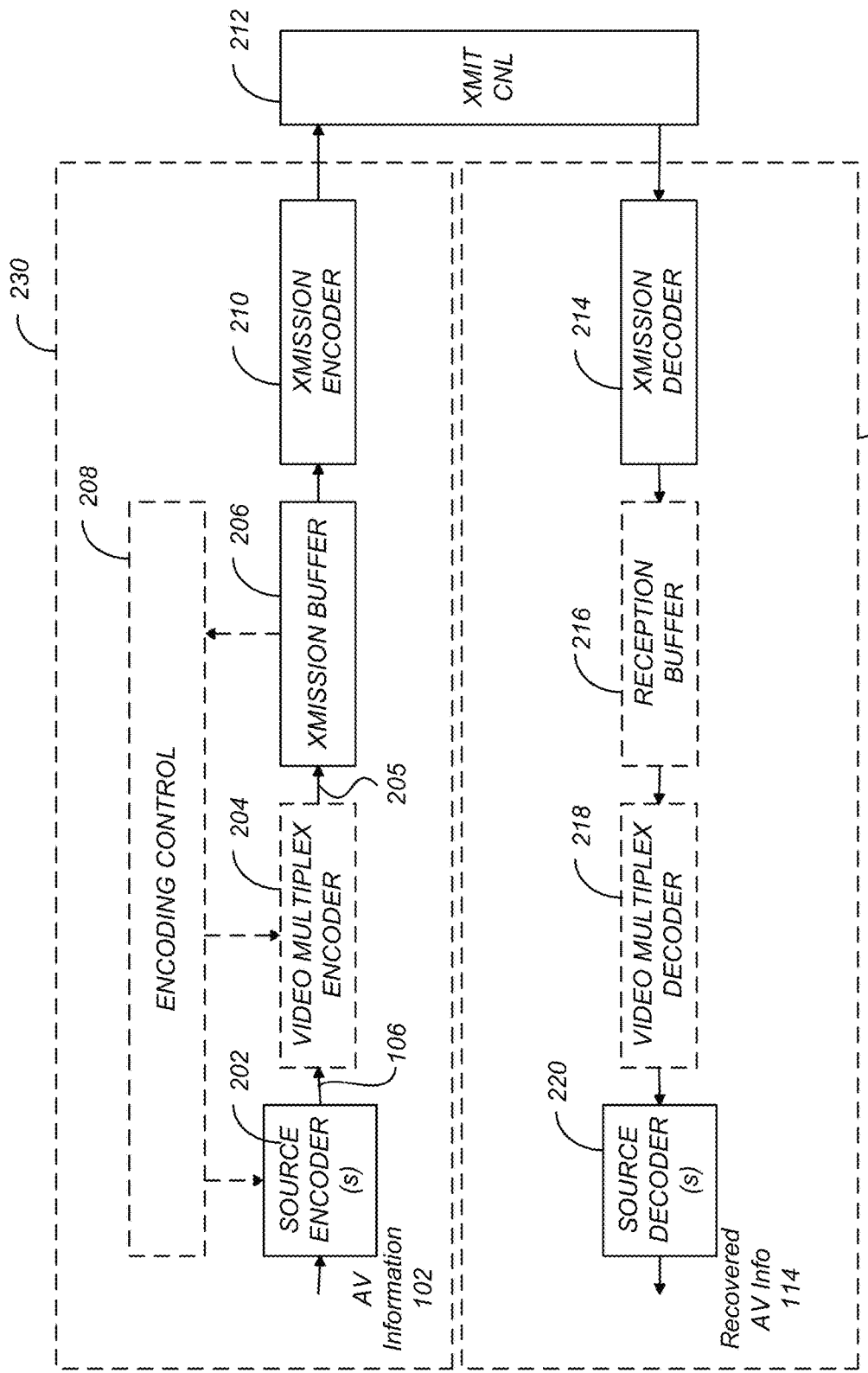
FIG. 2A is a diagram of one embodiment of a codec system in which the encoded AV information is transmitted to and received at another location.

FIG. 2A is a diagram of one embodiment of a codec system 200A in which the encoded AV information 106 is transmitted to and received at another location. A transmission segment 230 converts an input AV information 102 into a signal appropriate for transmission and transmits the converted signal over the transmission channel 212 to the reception segment 232. The reception segment 232 receives the transmitted signal, and converts the received signal into the recovered AV information 114 for presentation. As described above, due to coding and transmission losses and errors, the recovered AV information 114 may be of lower quality than the AV information 102 that was provided to the transmission segment 230. However, error-correcting systems may be included to reduce or eliminate such errors. For example, the encoded AV information 106 may be forward error correction (FEC) encoded by adding redundant information, and such redundant information can be used to identify and eliminate errors in the reception segment 232.

The transmission segment 230 comprises one or more source encoders 202 to encode multiple sources of AV information 102. The source encoder 202 encodes the AV information 102 primarily for purposes of compression to produce the encoded AV information 106, and may include, for example a processor and related memory storing instructions implementing a codec such as MPEG-1, MPEG-2, MPEG-4 AVC/H.264, HEVC or similar codec, as described further below.

The codec system 200A may also include optional elements indicated by the dashed lines in FIG. 2A. These optional elements include a video multiplex encoder 204, an encoding controller 208, and a video demultiplexing decoder 218. The optional video multiplex encoder 204 multiplexes encoded AV information 106 from an associated plurality of source encoder(s) 202 according to one or more parameters supplied by the optional encoding controller 208. Such multiplexing is typically accomplished in the time domain and is data packet based.

In one embodiment, the video multiplex encoder 204 comprises a statistical multiplexer, which combines the encoded AV information 106 from a plurality of source encoders 202 so as to minimize the bandwidth required for transmission. This is possible, since the instantaneous bit rate of the coded AV information 106 from each source encoder 202 can vary greatly with time according to the content of the AV information 102. For example, scenes having a great deal of detail and motion (e.g. sporting events) are typically encoded at higher bitrates than scenes with little motion or detail (e.g. portrait dialog). Since each source encoder 202 may produce information with a high instantaneous bitrate while another source encoder 202 produces information with a low instantaneous bit rate, and since the encoding controller 208 can command the source encoders 202 to encode the AV information 102 according to certain performance parameters that affect the instantaneous bit rate, the signals from each of the source encoders 202 (each having a temporally varying instantaneous bit rate) can be combined together in an optimal way to minimize the instantaneous bit rate of the multiplexed stream 205.

As described above, the source encoder 202 and the video multiplex coder 204 may optionally be controlled by an encoding controller 208 to minimize the instantaneous bit rate of the combined video signal. In one embodiment, this is accomplished using information from a transmission buffer 206 which temporarily stores the coded video signal and can indicate the fullness of the buffer 206. This allows the coding performed at the source encoder 202 or video multiplex coder 204 to be a function of the storage remaining in the transmission buffer 206.

The transmission segment 230 also may comprise a transmission encoder 210, which further encodes the video signal for transmission to the reception segment 232. Transmission encoding may include for example, the aforementioned FEC coding and/or coding into a multiplexing scheme for the transmission medium of choice. For example, if the transmission is by satellite or terrestrial transmitters, the transmission encoder 210 may encode the signal into a signal constellation before transmission via quadrature amplitude modulation (QAM) or similar modulation technique. Also, if the encoded video signal is to be streamed via an Internet protocol device and the Internet, the transmission encodes the signal according to the appropriate protocol. Further, if the encoded signal is to be transmitted via mobile telephony, the appropriate coding protocol is used, as further described below.

The reception segment 232 comprises a transmission decoder 214 to receive the signal that was coded by the transmission encoder 210 using a decoding scheme complementary to the coding scheme used in the transmission decoder 214. The decoded received signal may be temporarily stored by optional reception buffer 216, and if the received signal comprises multiple video signals, the received signal is multiplex decoded by video multiplex decoder 218 to extract the video signal of interest from the video signals multiplexed by the video multiplex encoder 204. Finally, the video signal of interest is decoded by source decoder 220 (hereinafter also referred to as a target decoding device) using a decoding scheme or codec complementary to the codec used by the source encoder 202 to encode the AV information 102.

In one embodiment, the transmitted data comprises a packetized video stream transmitted from a server (representing the transmitting segment 230) to a client (representing the receiving segment 232). In this case, the transmission encoder 210 may packetize the data and embed network abstract layer (NAL) units in network packets. NAL units define a data container that has header and coded elements, and may correspond to a video frame or other slice of video data.

The compressed data to be transmitted may packetized and transmitted via transmission channel 212, which may include a Wide Area Network (WAN) or a Local Area Network (LAN). Such a network may comprise, for example, a wireless network such as WiFi, an Ethernet network, an Internet network or a mixed network composed of several different networks. Such communication may be affected via a communication protocol, for example Real-time Transport Protocol (RTP), User Datagram Protocol (UDP) or any other type of communication protocol. Different packetization methods may be used for each network abstract layer (NAL) unit of the bitstream. In one case, one NAL unit size is smaller than the maximum transport unit (MTU) size corresponding to the largest packet size that can be transmitted over the network without being fragmented. In this case, the NAL unit is embedded into a single network packet. In another case, multiple entire NAL units are included in a single network packet. In a third case, one NAL unit may be too large to be transmitted in a single network packet and is thus split into several fragmented NAL units with each fragmented NAL unit being transmitted in an individual network packet. Fragmented NAL units are typically sent consecutively for decoding purposes.

The reception segment 232 receives the packetized data and reconstitutes the NAL units from the network packet. For fragmented NAL units, the client concatenates the data from the fragmented NAL units in order to reconstruct the original NAL unit. The reception segment client 232 decodes the received and reconstructed data stream and reproduces the video images on a display device and the audio data by a loud speaker.

Figure 2B:
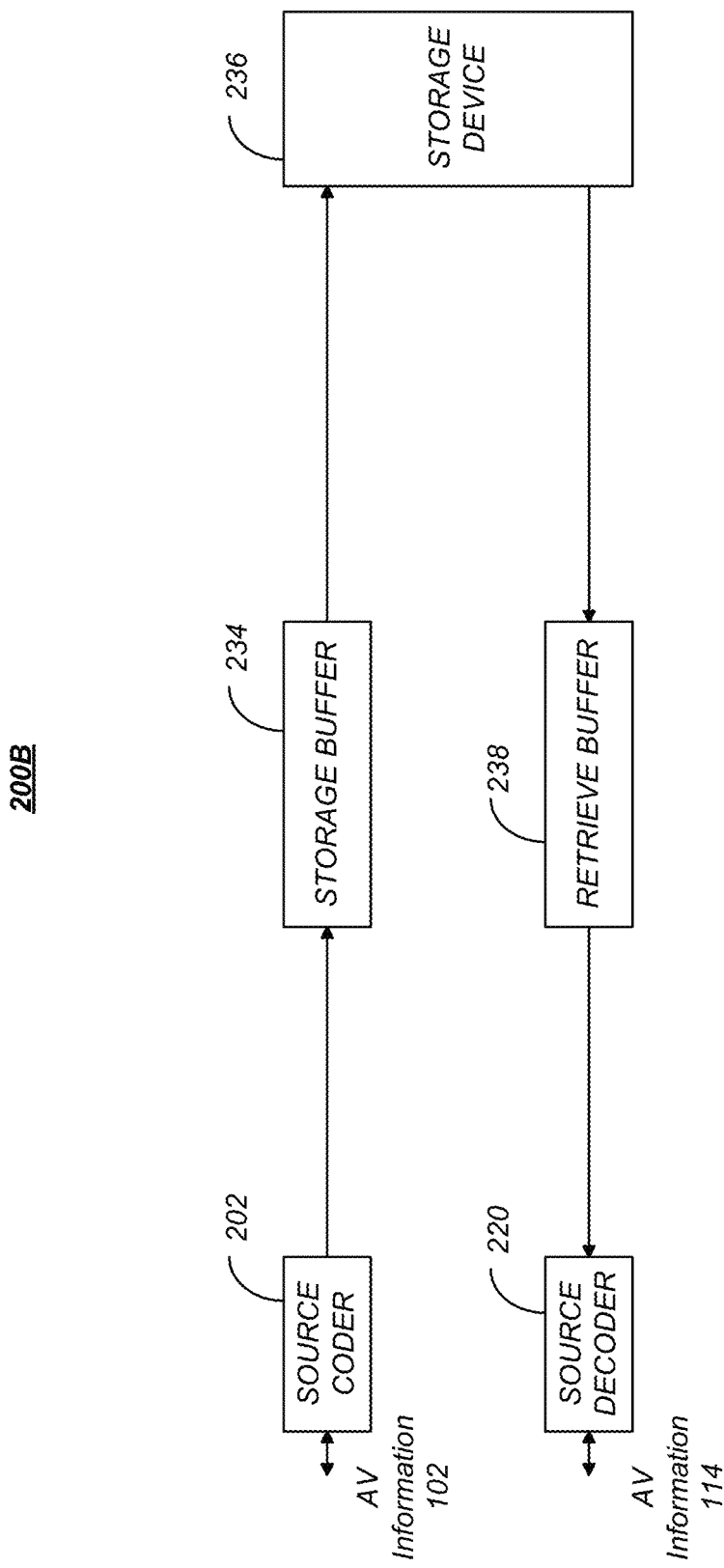
FIG. 2B is a diagram depicting an exemplary embodiment of codec system in which the encoded information is stored and later retrieved for presentation, hereinafter referred to as codec storage system.

FIG. 2B is a diagram depicting an exemplary embodiment of codec system in which the encoded information is stored and later retrieved for presentation, hereinafter referred to as codec storage system 200B. This embodiment may be used, for example, to locally store information in a digital video recorder (DVR), a flash drive, hard drive, or similar device. In this embodiment, the AV information 102 is source encoded by source encoder 202, optionally buffered by storage buffer 234 before storage in a storage device 236. The storage device 236 may store the video signal temporarily or for an extended period of time, and may comprise a hard drive, flash drive, RAM or ROM. The stored AV information is then retrieved, optionally buffered by retrieve buffer 238 and decoded by the source decoder 220.

Figure 2C:
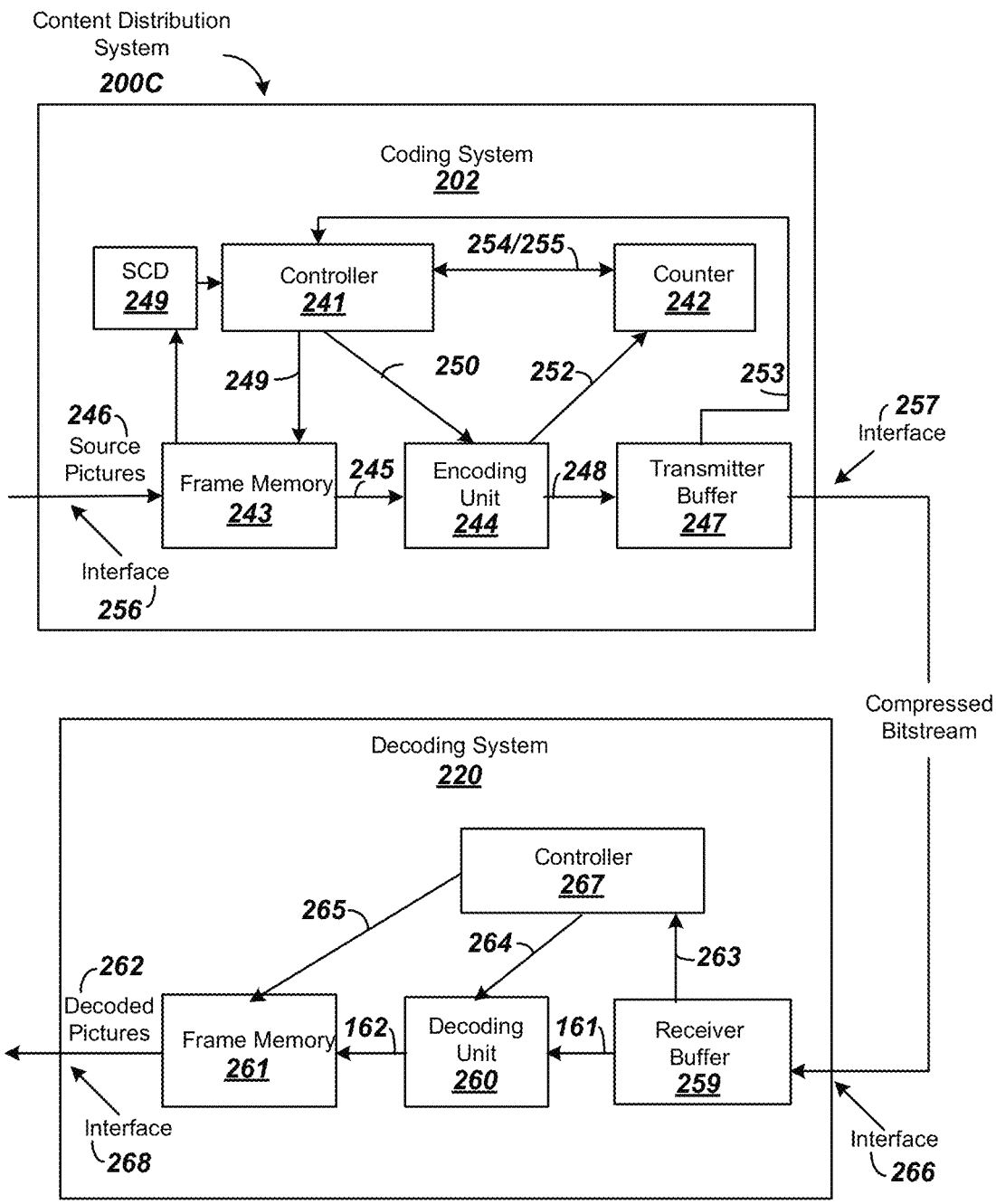
FIG. 2C is another diagram depicting an exemplary content distribution system comprising a coding system or encoder and a decoding system or decoder that can be used to transmit and receive HEVC data.

FIG. 2C is another diagram depicting an exemplary content distribution system 200C comprising a coding system or encoder 202 and a decoding system or decoder 220 that can be used to transmit and receive HEVC data.

In some embodiments, the coding system 202 can comprise an input interface 256, a scene change detector 249, a controller 241 a counter 242 a frame memory 243, an encoding unit 244, a transmitter buffer 247 and an output interface 257.

The decoding system 220 can comprise a receiver buffer 259, a decoding unit 260, a frame memory 261 and a controller 267. The coding system 202 and the decoding system 220 can be coupled with each other via a transmission path which can carry a compressed bit stream. The controller 241 of the coding system 202 can control the amount of data to be transmitted on the basis of the capacity of the transmitter buffer 247 or receiver buffer 259 and can include other parameters such as the amount of data per a unit of time. The controller 241 can control the encoding unit 244 to prevent the occurrence of a failure of a received signal decoding operation of the decoding system 220. The controller 241 can be a processor or include, by way of a non-limiting example, a microcomputer having a processor, a random access memory and a read only memory.

Source pictures 246 supplied from, by way of a non-limiting example, a content provider can include a video sequence of frames including source pictures in a video sequence. The source pictures 246 can be uncompressed or compressed. If the source pictures 246 are uncompressed, the coding system 202 can have an encoding function. If the source pictures 246 are compressed, the coding system 202 can have a transcoding function. Coding units can be derived from the source pictures 246 utilizing the controller 241. The frame memory 243 can have a first area that can be used for storing the incoming frames from the source pictures 246 and a second area that can be used for reading out the frames 245 and outputting them to the encoding unit 244. The controller 241 can output an area switching control signal 249 to the frame memory 243. The area switching control signal 249 can indicate whether the first area or the second area is to be utilized.

The controller 241 can output an encoding control signal 250 to the encoding unit 244. The encoding control signal 250 can cause the encoding unit 244 to start an encoding operation, such as preparing the Coding Units of a source picture. In response to the encoding control signal 250 from the controller 241, the encoding unit 244 can begin to read out the prepared Coding Units to a high-efficiency encoding process, such as a prediction coding process or a transform coding process which process the prepared Coding Units generating video compression data based on the source pictures associated with the Coding Units.

The encoding unit 244 can package the generated video compression data in a packetized elementary stream (PES) including video packets. The encoding unit 244 can map the video packets into an encoded video signal 248 using control information and a program time stamp (PTS) and the encoded video signal 248 can be transmitted to the transmitter buffer 247.

The encoded video signal 248, including the generated video compression data, can be stored in the transmitter buffer 247. The information amount counter 242 can be incremented to indicate the total amount of data in the transmitter buffer 247. As data is retrieved and removed from the buffer, the counter 242 can be decremented to reflect the amount of data in the transmitter buffer 247. The occupied area information signal 253 can be transmitted to the counter 242 to indicate whether data from the encoding unit 244 has been added or removed from the transmitter buffer 247 so the counter 242 can be incremented or decremented. The controller 241 can control the production of video packets produced by the encoding unit 244 on the basis of the occupied area information 253 which can be communicated in order to anticipate, avoid, prevent, and/or detect an overflow or underflow from taking place in the transmitter buffer 247.

The information amount counter 242 can be reset in response to a preset signal 254 generated and output by the controller 241. After the information amount counter 242 is reset, it can count data output by the encoding unit 244 and obtain the amount of video compression data and/or video packets, which have been generated. The information amount counter 242 can supply the controller 241 with an information amount signal 255 representative of the obtained amount of information. The controller 241 can control the encoding unit 244 so that there is no overflow at the transmitter buffer 247.

In some embodiments, the decoding system 220 can comprise an input interface 266, a receiver buffer 259, a controller 267, a frame memory 261, a decoding unit 260 and an output interface 268. The receiver buffer 259 of the decoding system 220 can temporarily store the compressed bit stream, including the received video compression data and video packets based on the source pictures from the source pictures 246. The decoding system 220 can read the control information and presentation time stamp information associated with video packets in the received data and output a frame number signal 263 which can be applied to the controller 267. The controller 267 can supervise the counted number of frames at a predetermined interval. By way of a non-limiting example, the controller 267 can supervise the counted number of frames each time the decoding unit 260 completes a decoding operation.

In some embodiments, when the frame number signal 263 indicates the receiver buffer 259 is at a predetermined capacity, the controller 267 can output a decoding start signal 264 to the decoding unit 260. When the frame number signal 263 indicates the receiver buffer 259 is at less than a predetermined capacity, the controller 267 can wait for the occurrence of a situation in which the counted number of frames becomes equal to the predetermined amount. The controller 267 can output the decoding start signal 264 when the situation occurs. By way of a non-limiting example, the controller 267 can output the decoding start signal 264 when the frame number signal 263 indicates the receiver buffer 259 is at the predetermined capacity. The encoded video packets and video compression data can be decoded in a monotonic order (i.e., increasing or decreasing) based on presentation time stamps associated with the encoded video packets.

In response to the decoding start signal 264, the decoding unit 260 can decode data amounting to one picture associated with a frame and compressed video data associated with the picture associated with video packets from the receiver buffer 259. The decoding unit 260 can write a decoded video signal 162 into the frame memory 261. The frame memory 261 can have a first area into which the decoded video signal is written, and a second area used for reading out decoded pictures 262 to the output interface 268.

In various embodiments, the coding system 202 can be incorporated or otherwise associated with a transcoder or an encoding apparatus at a headend and the decoding system 220 can be incorporated or otherwise associated with a downstream device, such as a mobile device, a set top box or a transcoder.

Source Encoding/Decoding

As described above, the encoders 202 employ compression algorithms to generate bit streams and/or files of smaller size than the original video sequences in the AV information 102. Such compression is made possible by reducing spatial and temporal redundancies in the original sequences.

Encoders 202 include those compliant with the video compression standard H.264/MPEG-4 AVC ("Advanced Video Coding") developed by between the "Video Coding Expert Group" (VCEG) of the ITU and the "Moving Picture Experts Group" (MPEG) of the ISO, in particular in the form of the publication "Advanced Video Coding for Generic Audiovisual Services" (March 2005), which is hereby incorporated by reference herein.

HEVC "High Efficiency Video Coding" (sometimes known as H.265) is expected to replace the H.264/MPEG-4 AVC. HEVC introduces new coding tools and entities that are generalizations of the coding entities defined in H.264/AVC, as further described below.

Figure 3:
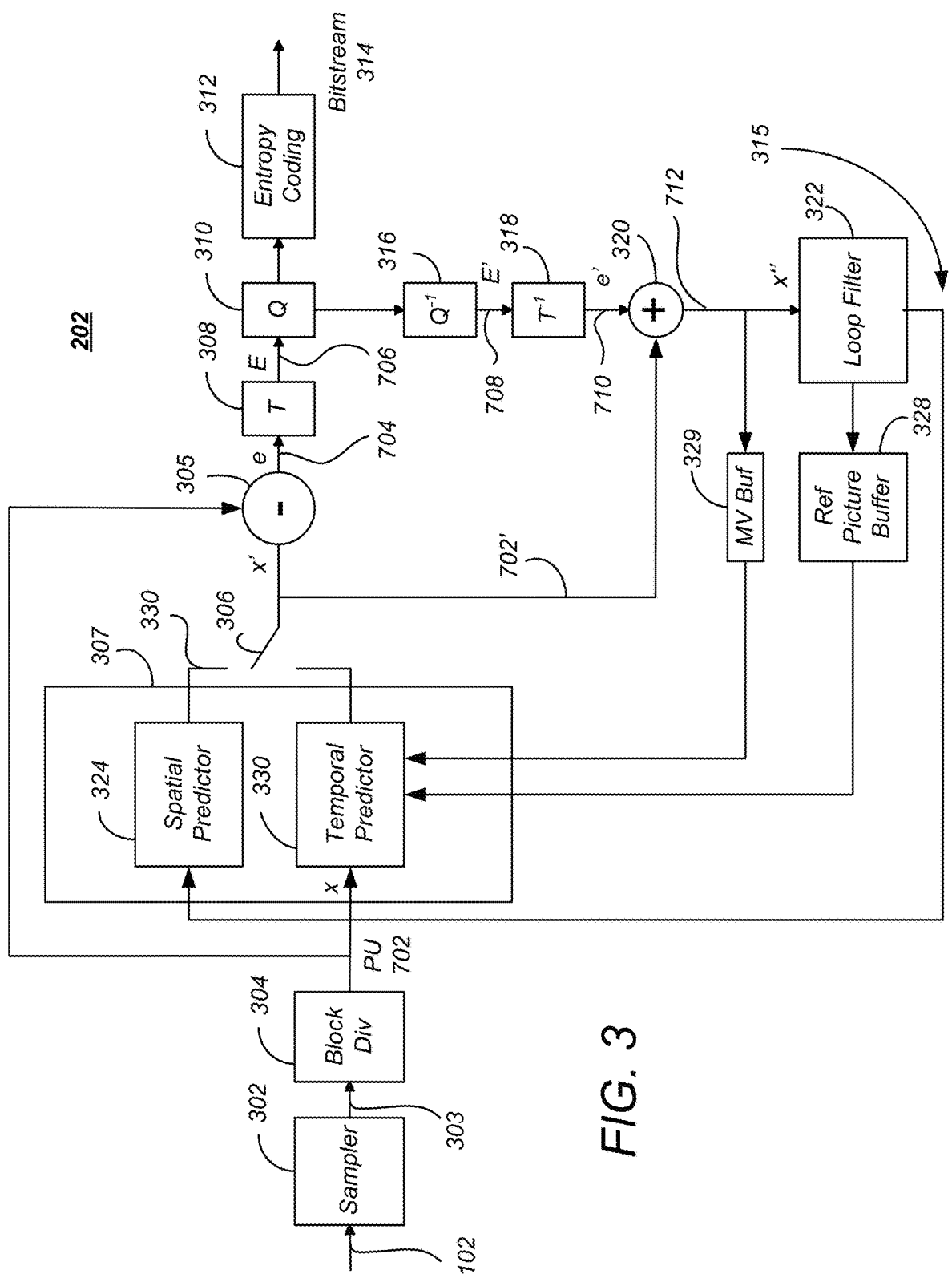
FIG. 3 is a block diagram illustrating one embodiment of the source encoder.

FIG. 3 is a block diagram illustrating one embodiment of the source encoder 202. The source encoder 202 accepts AV information 102 and uses sampler 302 to sample the AV information 102 to produce a sequence 303 of successive of digital images or pictures, each having a plurality of pixels. A picture can comprise a frame or a field, wherein a frame is a complete image captured during a known time interval, and a field is the set of odd-numbered or even-numbered scanning lines composing a partial image.

The sampler 302 produces a digitized (and as yet, uncompressed) picture sequence 303. Each digital picture can be represented by one or more matrices having a plurality of coefficients that represent information about the pixels that together comprise the picture. The value of a pixel can correspond to luminance or other information. In the case where several components are associated with each pixel, for example, red-green-blue (RGB) or luminance-chrominance (YCbCr, wherein Y is the luma component and Cb and Cr are the blue-difference and red-difference chroma components, respectively), each of these components may be separately processed.

Images can be segmented or partitioned into "slices," which may comprise a portion of the picture or may comprise the entire picture. In the H.264 standard, these slices are divided into coding entities called macroblocks (generally blocks of size 16 pixels×16 pixels) and each macroblock may in turn be divided into different sizes of data blocks, for example 4×4, 4×8, 8×4, 8×8, 8×16, 16×8. HEVC expands and generalizes the notion of the coding entity beyond that of the macroblock.

HEVC Coding Entities: CTU, CU, CTB, CB, PU and TU

Like other video coding standards, HEVC is a block-based hybrid spatial and temporal predictive coding scheme. However, HEVC introduces new coding entities that are not included with H.264/AVC standard. These coding entities include (1) coding tree units (CTUs), coding units (CUs), coding tree blocks (CTBs), coding blocks (CBs), predictive units (PUs) and transform units (TUs), and are further described below.

Figure 4:
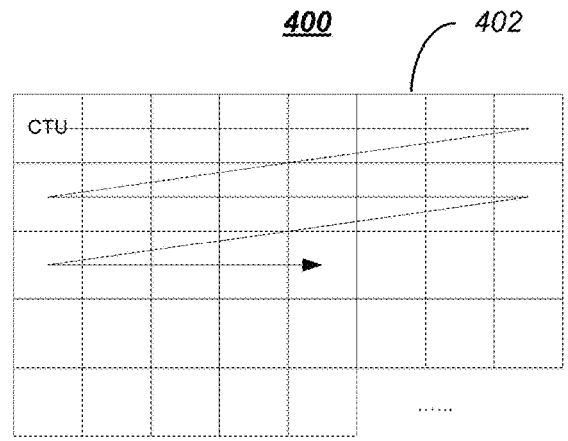
FIG. 4 is a diagram depicting a picture of audio visual information, such as one of the pictures in the picture sequence.

FIG. 4 is a diagram depicting a picture 400 of AV information 102, such as one of the pictures in the picture sequence 303. The picture 400 is spatially divided into non-overlapping square blocks known as coding tree unit(s), or CTUs 402. Unlike H.264 and previous video coding standards where the basic coding unit is macroblock of 16×16 pixels, the CTU 402 is the basic coding unit of HEVC, and can be as large as 128×128 pixels. As shown in FIG. 4, the CTUs 402 are typically referenced within the picture 400 in an order analogous to a progressive scan.

Each CTU 402 may in turn be iteratively divided into smaller variable size coding units (CUs) described by a "quadtree" decomposition further described below. Coding units are regions formed in the image to which similar encoding parameters are applied and transmitted in the bitstream 314.

Figures 5A, 5B:
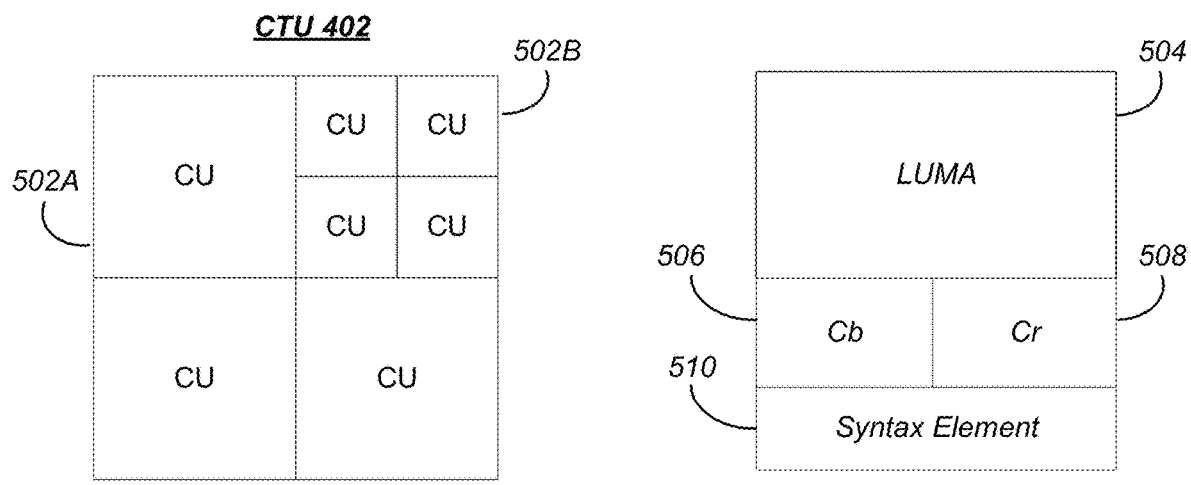
FIG. 5A is a diagram showing an exemplary partition of a coding tree unit into coding units.
FIG. 5B is a diagram showing a luma (Y), two chroma samples Cb and Cr, and associated syntax elements, used in coding tree blocks, coding blocks, prediction blocks and transform blocks.

FIG. 5A is a diagram showing an exemplary partition of a CTU 402 into CUs such as coding unit 502A and 502B (hereinafter alternatively referred to as coding unit(s) 502). A single CTU 402 can be divided into four CUs 502 such as CU 502A, each a quarter of the size of CTU 402. Each such divided CU 502A can be further divided into four smaller CUs 502B of quarter size of initial CU 502A.

The division of CTUs 402 into CUs 502A and into smaller CUs 502B is described by "quadtree" data parameters (e.g. flags or bits) that are encoded into the output bitstream 314 along with the encoded data as overhead known as syntax.

FIG. 5B is a diagram showing a luma (Y) 504, two chroma samples Cb 506 and Cr 508, and associated syntax elements 510, that comprise coding tree blocks (CTBs) or coding blocks (CBs), respectively, for the CTUs 402 or CUs 502A, 502B. This structure is also used for prediction blocks (PBs) associated with prediction units (PUs) and transform blocks (TBs) associated with transform units (TUs), as described in more detail below.

Figure 6:
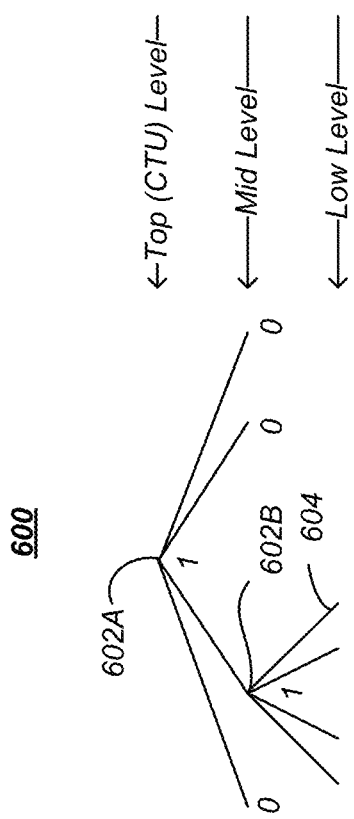
FIG. 6 is a diagram illustrating a representation of a representative quadtree and data parameters for the code tree block partitioning shown in FIG. 5A.

FIG. 6 is a diagram illustrating a representation of a representative quadtree 600 and data parameters for the CTU 402 partitioning shown in FIG. 5A. The quadtree 600 comprises a plurality of nodes including first node 602A at one hierarchical level and second node 602B at a lower hierarchical level (hereinafter, quadtree nodes may be alternatively referred to as "nodes" 602). At each node 602 of a quadtree, a "split flag" or bit "1" is assigned if the node 602 is further split into sub-nodes, otherwise a bit "0" is assigned.

For example, the CTU 402 partition illustrated in FIG. 5A can be represented by the quadtree 600 presented in FIG. 6, which includes a split flag of "1" associated with node 602A at the top CU 502 level (indicating there are 4 additional nodes at a lower hierarchical level). The illustrated quadtree 600 also includes a split flag of "1" associated with node 602B at the mid CU 502 level to indicate that this CU is also partitioned into four further CUs 502 at the next (bottom) CU level. The source encoder 202 may restrict the minimum and maximum CU 502 sizes, thus changing the maximum possible depth of the CU 502 splitting.

The source encoder 202 generates encoded AV information 106 in the form of a bitstream 314 that includes a first portion having encoded data for the CUs 502 and a second portion that includes overhead known as syntax elements. The encoded data includes data corresponding to the encoded CUs 502 (i.e., the encoded residuals together with their associated motion vectors, predictors, or related residuals as described further below). The second portion includes syntax elements that may represent encoding parameters which do not directly correspond to the encoded data of the blocks. For example, the syntax elements may comprise an address and identification of the CU 502 in the image, a quantization parameter, an indication of the elected Inter/Intra coding mode, the quadtree 600 or other information.

CUs 502 correspond to elementary coding elements and include two related sub-units: prediction units (PUs) and transform units (TUs), both of which have a maximum size equal to the size of the corresponding CU 502. Each PU and TU is comprised of prediction blocks (PBs) and transform blocks (TBs), respectively, formatted as shown in FIG. 5B, with a luma (Y) 504, two chroma samples Cb 506 and Cr 508, and associated syntax elements 510.

Figure 7:
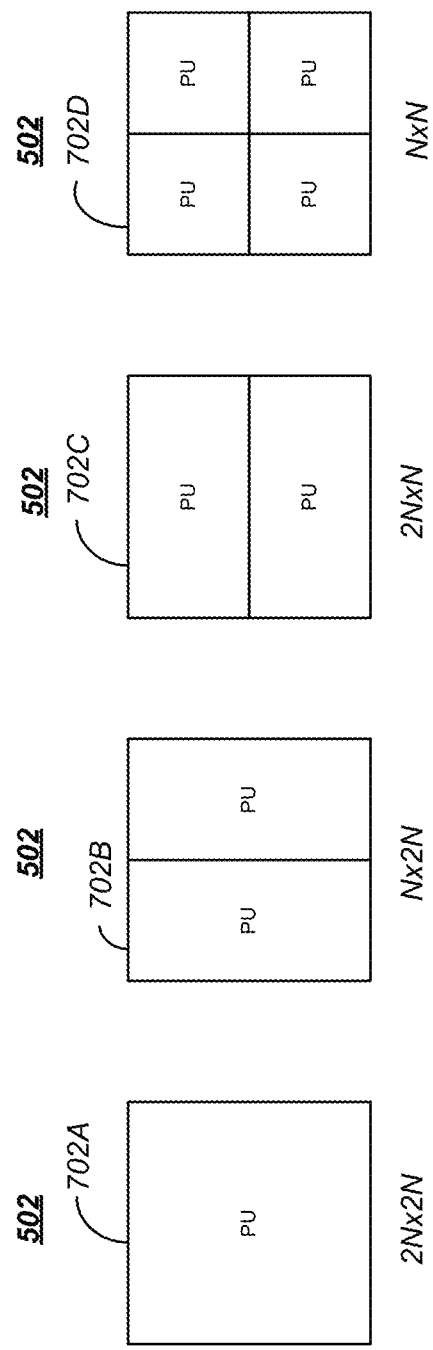
FIG. 7 is a diagram illustrating the partition of a coding unit into one or more prediction units.

FIG. 7 is a diagram illustrating the partition of a CU 502 into one or more PUs 702. A PU 702 corresponds to a partitioned CU 502 and is used to predict pixel values for intra-picture or inter-picture types. PUs 702 are an extension of the partitioning of H.264/AVC for motion estimation, and are defined for each CU 502 that is not further subdivided into other CUs ("split flag"=0). At each leaf 604 of the quadtree 600, a final (bottom level) CU 502 of 2N×2N can possess one of four possible patterns of PUs: 2N×2N (702A), 2N×N (702B), N×2N (702C) and N×N (702D), as shown in FIG. 7, as well as certain other asymmetric motion partitions (AMP) defined in the HEVC specification.

A CU 502 can be either spatially or temporally predictive coded. If a CU 502 is coded in "intra" mode, each PU 702 of the CU 502 can have its own spatial prediction direction and image information as further described below. Also, in the "intra" mode, the PU 702 of the CU 502 may depend on another CU 502 because it may use a spatial neighbor, which is in another CU. If a CU 502 is coded in "inter" mode, each PU 702 of the CU 502 can have its own motion vector(s) and associated reference picture(s).

Figure 8:
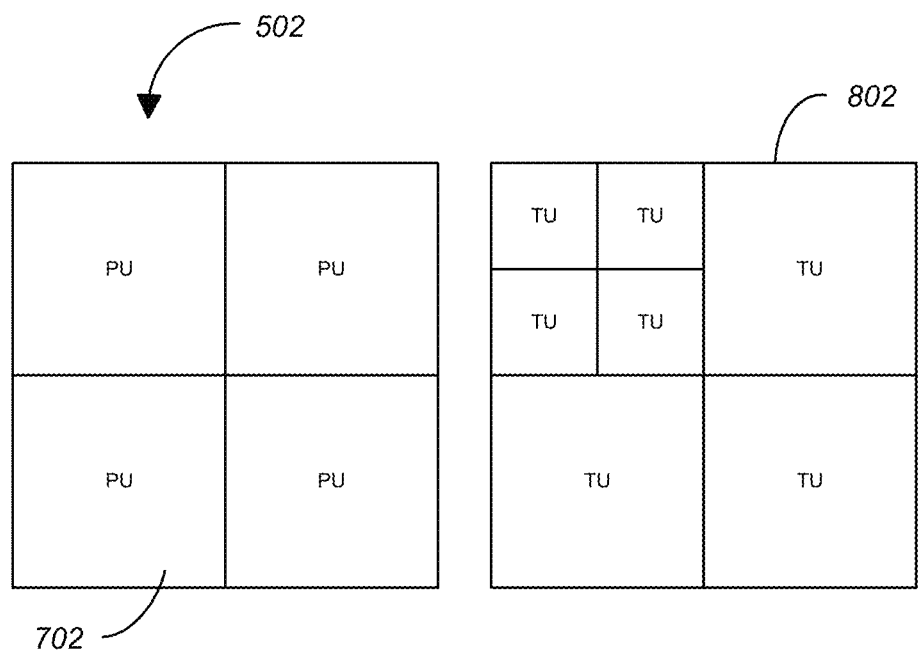
FIG. 8 is a diagram showing a coding unit partitioned into four prediction units and an associated set of transform units.

FIG. 8 is a diagram showing a CU 502 partitioned into four PUs 702 and an associated set of transform units (TUs) 802. TUs 802 are used to represent the elementary units that are spatially transformed by a transform such as the DCT (Discrete Cosine Transform) or the DST (discrete sine transform). The size and location of each block transform TU 802 within a CU 502 is described by a "residual" quadtree (RQT).

Figure 9:
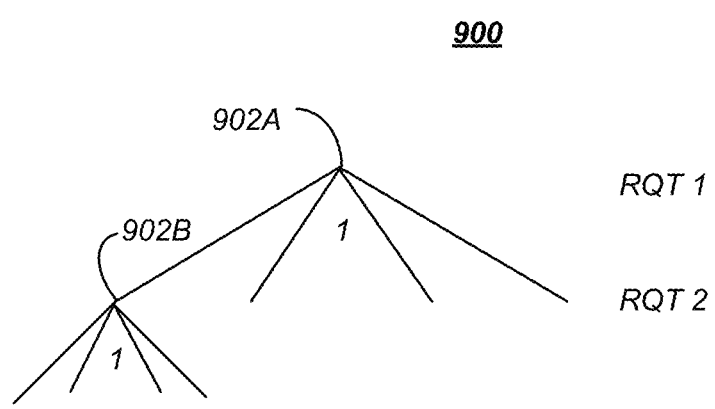
FIG. 9 is a diagram showing a residual quad tree for the transform units associated with the coding unit in the example of FIG. 8.

FIG. 9 is a diagram showing RQT 900 for TUs 802 for the CU 502 in the example of FIG. 8. Note that the "1" at the first node 902A of the RQT 900 indicates that there are four branches and that the "1" at the second node 902B at the adjacent lower hierarchical level indicates that the indicated node further has four branches. The data describing the RQT 900 is also coded and transmitted as an overhead in the bitstream 314.

The coding parameters of a video sequence may be stored in dedicated NAL units called parameter sets, which include a Video Parameter Sets (VPS) that describes the overall characteristics of coded video sequences; a Sequence Parameter Set (SPS) that contains information that applies to all slices of a video sequence and is fixed within a sequence; and a Picture Parameter Set (PPS) that conveys information that could change from picture to picture.

Spatial and Temporal Prediction

One of the techniques used to compress a bitstream 314 is to forego the storage of pixel values themselves and instead, predict the pixel values using a process that can be repeated at the decoder 220 and store or transmit the difference between the predicted pixel values and the actual pixel values (known as the residual). So long as the decoder 220 can compute the same predicted pixel values from the information provided, the actual picture values can be recovered by adding the residuals to the predicted values. The same technique can be used to compress other data as well.

Referring back to FIG. 3, each PU 702 of the CU 502 being processed is provided to a predictor module 307. The predictor module 307 predicts the values of the PUs 702 based on information in nearby PUs 702 in the same frame (intra-frame prediction, which is performed by the spatial predictor 324) and information of PUs 702 in temporally proximate frames (inter-frame prediction, which is performed by the temporal predictor 330). Temporal prediction, however, may not always be based on a collocated PU, since collocated PUs are defined to be located at a reference/non-reference frame having the same x and y coordinates as the current PU 702. These techniques take advantage of spatial and temporal dependencies between PUs 702.

Encoded units can therefore be categorized to include two types: (1) non-temporally predicted units and (2) temporally predicted units. Non-temporally predicted units are predicted using the current frame, including adjacent or nearby PUs 702 within the frame (e.g. intra-frame prediction), and are generated by the spatial predictor 324. Temporally predicted units are predicted from one temporal picture (e.g. P-frames) or predicted from at least two reference pictures temporally ahead and/or behind (i.e. B-frames).

Spatial Prediction

Figure 10:
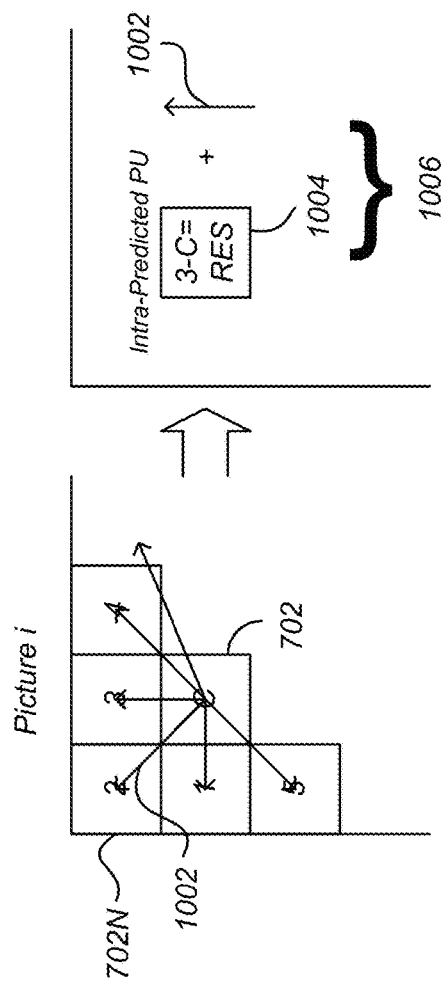
FIG. 10 is a diagram illustrating spatial prediction.

FIG. 10 is a diagram illustrating spatial prediction of PUs 702. A picture may comprise a PU 702 and spatially proximate other PUs 1-4, including nearby PU 702N. The spatial predictor 324 predicts the current block (e.g. block C of FIG. 10) by means of an "intra-frame" prediction which uses PUs 702 of already-encoded other blocks of pixels of the current image.

The spatial predictor 324 locates a nearby PU (e.g. PU 1, 2, 3, 4 or 5 of FIG. 10) that is appropriate for spatial coding and determines an angular prediction direction to that nearby PU. In HEVC, 35 directions can be considered, so each PU may have one of 35 directions associated with it, including horizontal, vertical, 45 degree diagonal, 135 degree diagonal, etc. The spatial prediction direction of the PU is indicated in the syntax.

Referring back to the spatial predictor 324 of FIG. 3, this located nearby PU is used to compute a residual PU 704 (*e*) as the difference between the pixels of the nearby PU 702N and the current PU 702, using element 305. The result is an intra-predicted PU element 1006 that comprises a prediction direction 1002 and the intra-predicted residual PU 1004. The prediction direction 1002 may be coded by inferring the direction from spatially proximate PUs, and the spatial dependencies of the picture, enabling the coding rate of the intra prediction direction mode to be reduced.

Temporal Prediction

Figure 11:
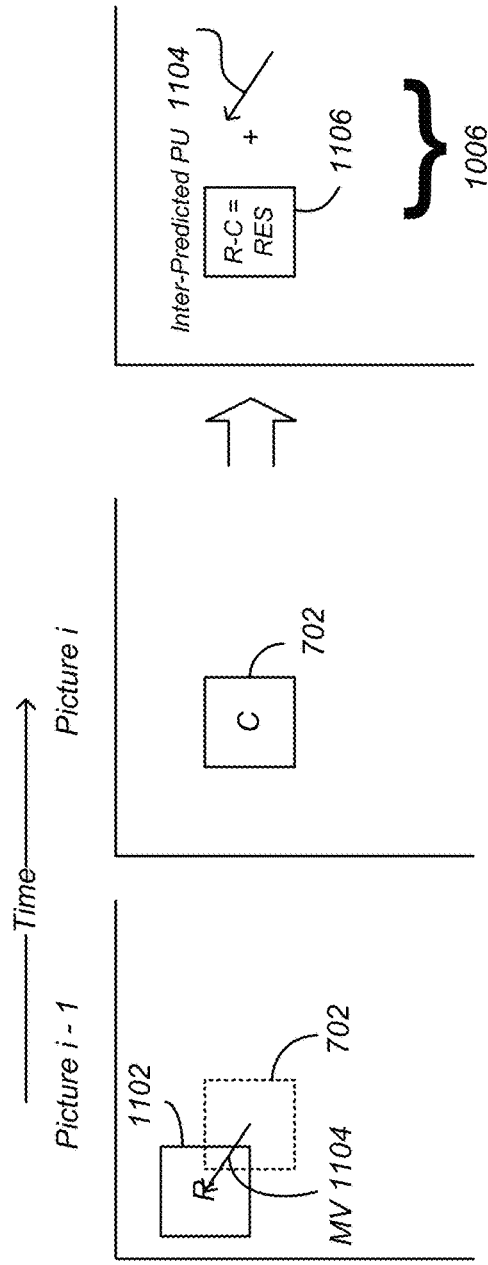
FIG. 11 is a diagram illustrating temporal prediction.

FIG. 11 is a diagram illustrating temporal prediction. Temporal prediction considers information from temporally neighboring pictures or frames, such as the previous picture, picture i−1.

Generally, temporal prediction includes single-prediction (P-type), which predicts the PU 702 by referring to one reference area from only one reference picture, and multiple prediction (B-type), which predicts the PU by referring to two reference areas from one or two reference pictures. Reference images are images in the video sequence that have already been coded and then reconstructed (by decoding).

The temporal predictor 330 identifies, in one or several of these reference areas (one for P-type or several for B-type), areas of pixels in a temporally nearby frame so that they can be used as predictors of this current PU 702. In the case where several areas predictors are used (B-type), they may be merged to generate one single prediction. The reference area 1102 is identified in the reference frame by a motion vector (MV) 1104 that defines the displacement between the current PU 702 in current frame (picture i) and the reference area 1102 identified by a reference index (refIdx) in the reference frame (picture i−1). A PU in a B-picture may have up to two MVs. Both MV and refIdx information are included in the syntax of the HEVC bitstream.

Referring again to FIG. 3, a difference between the pixel values between of the reference area 1102 and the current PU 702 may be computed by element 305 as selected by switch 306. This difference is referred to as the residual of the inter-predicted PU 1006. At the end of the temporal or inter-frame prediction process, the current PU 1006 is composed of one motion vector MV 1104 and a residual 1106.

However, as described above, one technique for compressing data is to generate predicted values for the data using means repeatable by the decoder 220, computing the difference between the predicted and actual values of the data (the residual) and transmitting the residual for decoding. So long as the decoder 220 can reproduce the predicted values, the residual values can be used to determine the actual values.

This technique can be applied to the MVs 1104 used in temporal prediction by generating a prediction of the MV 1104, computing a difference between the actual MV 1104 and the predicted MV 1104 (a residual) and transmitting the MV residual in the bitstream 314. So long as the decoder 220 can reproduce the predicted MV 1104, the actual MV 1104 can be computed from the residual. HEVC computes a predicted MV for each PU 702 using the spatial correlation of movement between nearby PUs 702.

Figure 12:
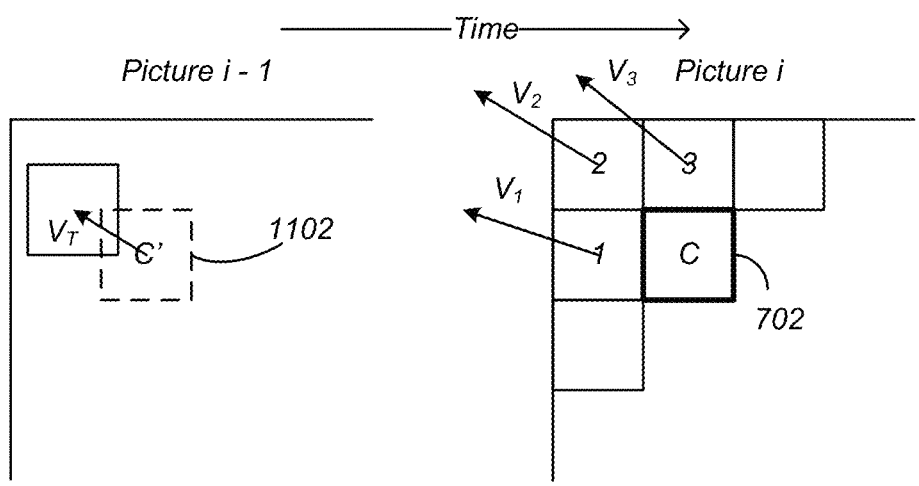
FIG. 12 is a diagram illustrating the use of motion vector predictors.

FIG. 12 is a diagram illustrating the use of motion vector predictors (MVPs) in HEVC. Motion vector predictors $V_1$, $V_2$ and $V_3$ are taken from the MVs 1104 of a plurality of blocks 1, 2, and 3 situated nearby or adjacent the block to encode (C). As these vectors refer to motion vectors of spatially neighboring blocks within the same temporal frame and can be used to predict the motion vector of the block to encode, these vectors are known as spatial motion predictors.

FIG. 12 also illustrates temporal motion vector predictor VT which is the motion vector of the co-located block C' in a previously decoded picture (in decoding order) of the sequence (e.g. block of picture i−1 located at the same spatial position as the block being coded (block C of image i).

The components of the spatial motion vector predictors $V_1$, $V_2$ and $V_3$ and the temporal motion vector predictor VT can be used to generate a median motion vector predictor $V_M$. In HEVC, the three spatial motion vector predictors may be taken as shown in FIG. 12, that is, from the block situated to the left of the block to encode ($V_1$), the block situated above ($V_3$) and from one of the blocks situated at the respective corners of the block to encode ($V_2$), according to a predetermined rule of availability. This MV predictor selection technique is known as Advanced Motion Vector Prediction (AMVP).

A plurality of (typically five) MV predictor (MVP) candidates having spatial predictors (e.g. $V_1$, $V_2$ and $V_3$) and temporal predictor(s) VT is therefore obtained. In order to reduce the overhead of signaling the motion vector predictor in the bitstream, the set of motion vector predictors may be reduced by eliminating data for duplicated motion vectors (for example, MVs which have the same value as other MVs may be eliminated from the candidates).

The encoder 202 may select a "best" motion vector predictor from among the candidates, and compute a motion vector predictor residual as a difference between the selected motion vector predictor and the actual motion vector, and transmit the motion vector predictor residual in the bitstream 314. To perform this operation, the actual motion vector must be stored for later use by the decoder 220 (although it is not transmitted in the bit stream 314. Signaling bits or flags are included in the bitstream 314 to specify which MV residual was computed from the normalized motion vector predictor, and are later used by the decoder to recover the motion vector.

The intra-predicted residuals 1004 and the inter-predicted residuals 1106 obtained from the spatial (intra) or temporal (inter) prediction process are then transformed by transform module 308 (depicted in FIG. 3) into the transform units (TUs) 802 described above. A TU 802 can be further split into smaller TUs using the RQT decomposition described above with respect to FIG. 9. In HEVC, generally 2 or 3 levels of decompositions are used and authorized transform sizes are from 32×32, 16×16, 8×8 and 4×4. As described above, the transform is derived according to a discrete cosine transform (DCT) or discrete sine transform (DST).

The residual transformed coefficients are then quantized by quantizer 310. Quantization plays a very important role in data compression. In HEVC, quantization converts the high precision transform coefficients into a finite number of possible values. Although the quantization permits a great deal of compression, quantization is a lossy operation, and the loss by quantization cannot be recovered.

The coefficients of the quantized transformed residual are then coded by means of an entropy coder 312 and then inserted into the compressed bit stream 314 as a part of the useful data coding the images of the AV information. Coding syntax elements may also be coded using spatial dependencies between syntax elements to increase the coding efficiency. HEVC offers entropy coding such as context-adaptive binary arithmetic coding (CABAC). Other forms or entropy or arithmetic coding may also be used.

In order to calculate the predictors used above, the encoder 202 decodes already encoded PUs 702 using "decoding" loop 315, which includes elements 316, 318, 320, 322, 328. This decoding loop 315 reconstructs the PUs and images from the quantized transformed residuals.

The quantized transform residual coefficients E are provided to dequantizer 316, which applies the inverse operation to that of quantizer 310 to produce dequantized transform coefficients of the residual PU (E') 708. The dequantized data 708 is then provided to inverse transformer 318 which applies the inverse of the transform applied by the transform module 308 to generate reconstructed residual coefficients of the PU (e') 710.

The reconstructed coefficients of the residual PU 710 are then added to the corresponding coefficients of the corresponding predicted PU (x') 702' selected from the intra-predicted PU 1004 and the inter-predicted PU 1106 by selector 306. For example, if the reconstructed residual comes from the "intra" coding process of the spatial predictor 324, the "intra" predictor (x') is added to this residual in order to recover a reconstructed PU (x") 712 corresponding to the original PU 702 modified by the losses resulting from a transformation, for example in this case the quantization operations. If the residual 710 comes from an "inter" coding process of the temporal predictor 330, the areas pointed to by the current motion vectors (these areas belong to the reference images stored in reference buffer 328 referred by the current image indices) are merged then added to this decoded residual. In this way the original PU 702 is modified by the losses resulting from the quantization operations.

To the extent that the encoder 202 uses motion vector prediction techniques analogous to the image prediction techniques described above, the motion vector may be stored using motion vector buffer 329 for use in temporally subsequent frames. A flag may be set and transferred in the syntax to indicate that the motion vector for the currently decoded frame should be used for at least the subsequently coded frame instead of replacing the contents of the MV buffer 329 with the MV for the current frame.

A loop filter 322 is applied to the reconstructed signal (x") 712 in order to reduce the effects created by heavy quantization of the residuals obtained, and to improve the signal quality. The loop filter 322 sequentially applies a deblocking filter (DBF) and a sample adaptive offset (SAO) filter in the inter-picture prediction loop.

The loop filter 322 applies the DBF for smoothing borders between PUs to visually attenuate high frequencies created by the coding process and a linear filter that is applied after all of the PUs for an image have been decoded to minimize the sum of the square difference (SSD) with the original image. The linear filtering process is performed on a frame by frame basis and uses several pixels around the pixel to be filtered, and also uses spatial dependencies between pixels of the frame. The linear filter coefficients may be coded and transmitted in one header of the bitstream, typically a picture or slice header.

The loop filter 322 applies the SAO filter to allow for better reconstruction of the original signal amplitudes by applying offsets stored in a lookup table in the bitstream. The SAO filter can be disabled or applied in one of two modes per CTB or CB: edge offset mode or band offset mode.

The edge offset mode operates by comparing the value of a sample to two of its eight neighbors using one of four directional gradient patterns. Based on a comparison with these two neighbors, the sample is classified into one of five categories: minimum, maximum, an edge with the sample having the lower value, an edge with the sample having the higher value, or monotonic. For each of the first four categories an offset is applied.

The band offset mode applies an offset based on the amplitude of a single sample. A sample is categorized by its amplitude into one of 32 bands (histogram bins). Offsets are specified for four consecutive of the 32 bands, because in flat areas which are prone to banding artifacts, sample amplitudes tend to be clustered in a small range. The SAO filter was designed to increase picture quality, reduce banding artifacts, and reduce ringing artifacts.

The filtered images, also known as reconstructed images, are then stored as reference images from reference image buffer 328 in order to allow the subsequent "inter" predictions taking place during the compression of the subsequent images of the current video sequence.

Picture Level Quantization Parameter Rate Control

For quantization, HEVC uses essentially the same uniform-reconstruction quantization (URQ) scheme controlled by a quantization parameter (QP) as in H.264/MPEG-4 AVC. The range of the QP values is defined from 0 to 51, and an increase by 6 doubles the quantization step size, such that the mapping of QP values to step sizes is approximately logarithmic. Quantization scaling matrices are also supported.

To reduce the memory needed to store frequency-specific scaling values, only quantization matrices of sizes 4×4 and 8×8 are used. For the larger transformations of 16×16 and 32×32 sizes, an 8×8 scaling matrix is sent and is applied by sharing values within 2×2 and 4×4 coefficient groups in frequency sub-spaces—except for values at DC positions, for which distinct values are sent and applied.

It is also advantageous to adapt QP estimates on a sub-picture basis. This can exploit the non-uniform nature of HEVC coding. Spatial masking and distortion is less noticeable in busy (higher complexity) areas than in non-busy (smooth or less complex) areas. Accordingly, a higher QP parameter may be assigned to a busy area of the picture (thus requiring fewer bits to code) and a lower QP parameter (resulting in encoding using a greater number of bits) may be used in smooth areas.

Region Specific Encoding and SAO-Sensitive Slice-Width-Adaptation

In this invention, the HEVC encoder uses guidance from the HVS, or edge or ROI (region of interest) aspects, to perform the following steps or functions:
1. An edge map comprised of one or more edge blocks is detected in an image using, as a non-limiting example, one or more hardware-assisted primitives, such as INTEL™ IPPs (Integrated Performance Primitives) edge operators. Example edge operators include Prewitt, Sobel, Canny, Difference of Gaussian, Laplacian or other edge operators. Hence, the use of hardware-assisted primitives makes for low complexity implementations, and the complexity for this step can be expediently bounded.
2. Based on the edge map, a slice width may be chosen.
3. SAO filtering is selectively turned on or off in the loop filter 322, based on the presence of the edge map or otherwise. A measure of how many edge pixels are present in a specific region can be used since, typically, regions would contain a few or many edges (rather than none or a completely-edge-region). More advanced fuzzy classification methods can be used. Adaptive slice width selection is used so that the SAO filtering is turned on only within ROI slices.

For the blocks containing edges that undergo edge based processing, the following steps or functions can be configured dynamically during encoding of such blocks:

Smaller prediction block sizes around edges (for example, 4×4 or 8×8) for intra.

Smaller TU sizes around edges (for example, 4×4 or 8×8) for intra or inter.

Finer QP and small block-sizes for edge blocks that will be used as references.

It can be determined as to which blocks are used as references for intra. For inter, Pass 1 encoding shows which blocks would be used as references.

Improve prediction by more intense sub-pixel motion estimation (ME) (include more references).

Motion vectors of panned regions show many adjacent blocks having nearly same MV (they move together in panning). MVs of blocks which suffer more mosquito noise during encoding would be showing different orientations. The global motion vector can be used to detect panned regions.

The table set forth below describes how these cases can be categorized as bins and processed accordingly.

TABLE 1

Categorization of edge maps and processing involved under this invention

| Category | Characteristic | Invention uses the following processing |
|---|---|---|
| Bin 1 | When edge blocks are contiguous, and enough in number, form a slice partition with an adaptive slice width. | Induce a slice partition on the contiguous blocks that have edges and encode such slices turning SAO on. |

TABLE 1-continued

Categorization of edge maps and processing involved under this invention

| Category | Characteristic | Invention uses the following processing |
|---|---|---|
| | (Use empirical thresholds for the above determination.) | Advantage: bitrate savings as well as computational savings compared to unconditionally turning SAO on everywhere or turning SAO off everywhere. |
| Bin 2 | When edge blocks are not contiguous, perform edge block processing. The edge blocks are not static, and also do not "move together" (this can be detected by motion field or motion vectors characteristics). Rather, the blocks move in different directions and have high edge content, whereupon higher mosquito noise results, i.e., unlike a large "rigid body motion." | Do edge block processing with maximally intense processing (e.g. around edges): induce small intra blocks (4 × 4, 8 × 8), small transform block size (4 × 4, 8 × 8), small inter prediction block size (4 × 4, 8 × 8, asymmetric e.g. 4 × 8, 8 × 4, etc.), finer quantization parameters (<35) independently parameterized for exact value for each of these intra/inter prediction block sizes, and for intra, more candidate modes, perform Motion Estimation at full resolution as opposed to subsampled space in pyramid, heavy duty search for fractional pixel motion estimation (e.g. half and quarter pixel). |
| Bin 3 | Medium or low number of edges, non-contiguous. | Progressively decrease the amount of processing (corresponding to medium to low number of edges) which has been described for bin 2. For example, use: medium intra block size (16 × 16, 32 × 32), medium transform block size (e.g. 16 × 16), medium inter prediction block size (16 × 16), Intra - relatively candidate modes than in bin 2, Motion Estimation not necessarily at full resolution and may include direct search in sub-sampled space in pyramid, lesser search in fractional pixel motion estimation (e.g. half and quarter pixel). |
| Bin 4 | No edge content or edges "move together" as in a rigid body motion which does not pose mosquito noise risks. | None of the above processing. |

Edge Processing

Consider the edge map as detected by a Sobel or Prewitt or Canny operator, for example. This is obtained by running edge detection on each frame, which basically gives a map of gradients or adjacent-pixels, evaluated on a per-pixel-position.

Setting Gradient or Difference Limits

In order to run edge detection, the first level of parameterization is to set lower and higher limits of adjacent-pixel-differences (or gradients). A band-pass filtering of gradients (with upper and lower thresholds parameters configured) determines which pixels are classified as edges.

For example, pixels may be classified as edges when the gradient falls between the values of DLL (Difference-Lower-Limit) and DHL (Difference-Higher-Limit). An example for values of DLL and DHL can be 80 and 255. All pixels with a gradient between DLL and DHL which are adjacent to a pixel already determined as edge also are declared as edge pixels.

Classification of Coding Block as Edge Block

In one embodiment, the classification of a coding block (CB) as an edge block is performed by the following steps or functions:

1. Determine the edge map using the chosen operator, as described above.
2. Perform the band-pass filtering by setting gradient or difference limits, as described above.
3. As an example, for a block (CU) size of 32×32, parameterize an upper and lower thresholds parameters to classify the block (CU) as an edge block if the number of contained pixel-edges (obtained by step #2 above) is between these limits. In one example, BL32 (Block-Low-edge-count-parameter for block size 32×32) and BH32 (Block-High-edge-count-parameter for block size 32×32) parameters are set to 64 and 512 for a block (CU) size of 32×32.
4. For edge-based processing in HEVC encoding, note that the edge detection is carried out on a specific block size, for example, 32×32 or 16×16, in a preprocessing step (i.e. prior to encoding) that works on the pixel domain. The BL32 and BH32 are directly used to make decisions on which blocks are edges. During actual encoding, the CU sizes are decided. At this stage, the decisions on which of the blocks were edges in the preprocessing step can easily be used to map the CU region into constituent edge or non-edge blocks. In other words, the CU region contains blocks that have been determined as edge or non-edge blocks in the preprocessing step. These edge or non-edge blocks guide the exemplary actions as in step #5 below. The constituent edge or non-edge blocks can be used to guide the prediction block size and transform block size that can be used as candidates.
5. For the block size under consideration, which is used for each of the following decisions in HEVC, use the blocks that get classified as edge-blocks from steps #3 and #4 above, to further perform the following exemplary (non-limiting) actions:
    induce small intra blocks (4×4, 8×8) within the block (CU) being coded;
    small transform block size (4×4, 8×8) within the block (CU) being coded;
    small inter prediction block size (4×4, 8×8, asymmetric e.g. 4×8, 8×4, etc., within the block (CU) being coded;
    improved (finer) quantization parameters (<35) independently parameterized for exact value for each of these intra/inter prediction block sizes, within the block (CU) being coded;
    for intra, more candidate modes, within the block (CU) being coded;
    perform Motion Estimation at full resolution as opposed to sub sampled space in pyramid, heavy duty search for fractional pixel motion estimation (e.g. half and quarter pixel), within the block (CU) being coded.
6. From experimental results, it seems better to also have a mask which filters out only edges which are associated with moving portions of the frame. Note that non-moving portions are associated with static edges inherent in the static visual content. There are several ways to determine moving edges and create the mask. These range from simple differences between frames to more sophisticated motion vector analysis used for deriving the mask.

Adaptive Slice Width and Selectively Enabling the SAO Filter

Quantization makes reconstructed and original blocks differ. The quantization error is not uniformly distributed among pixels. There is a bias in distortion around edges (due to the Gibbs effect).

As noted above, HEVC uses two filtering stages in its in-loop filtering 322, namely, DBF and SAO filters. The SAO filtering adds an offset to a (deblocked) pixel value according to an SAO type which is based on edge direction/shape (edge offset) and pixel value (band offset) or unchanged (off).

In addition to correction at local extremes, HEVC allows alternative correction to specific ranges of pixel values.

Figure 13A:
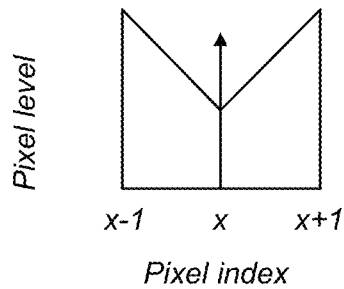
FIGS. 13A-F are graphs of pixel level vs. pixel index.
Figure 13B:
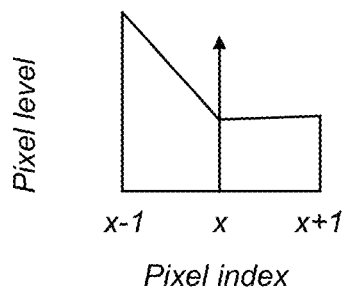
Figure 13C:
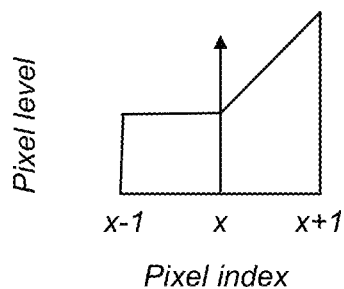
Figure 13D:
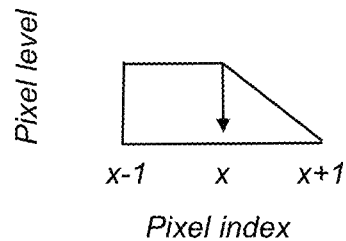
Figure 13E:
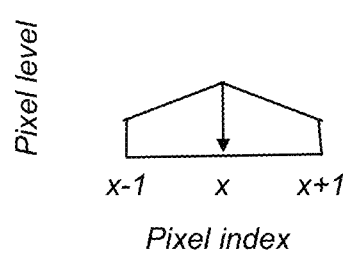
Figure 13F:
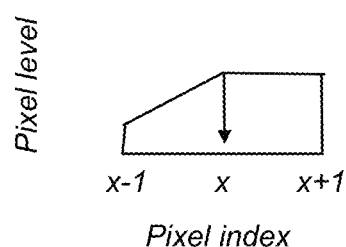
Figure 14A:
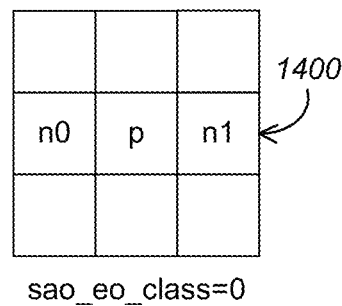
FIGS. 14A-D illustrate different Edge Types, and how an edge is searched across one of the directions.
Figure 14B:
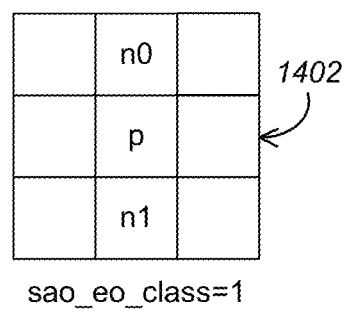
Figure 14C:
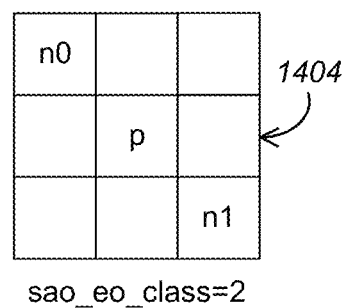
Figure 14D:
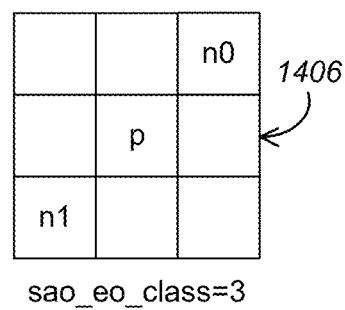

For example, FIGS. 13A-13F are graphs of pixel level vs. pixel index (x−1, x, x+1) that illustrate the offsets in SAO filtering, wherein FIGS. 13A, 13B and 13C are graphs of positive offsets applied in the case of local minima (local min) and FIGS. 13D, 13E and 13F are graphs of negative offsets applied in case of local maxima (local max). The arrows in each graph at pixel index x show the offset direction.

It has been reported that SAO filtering reduces ringing and mosquito artifacts (which become more serious with large transforms) and improves subjective quality for low compression ratio video.

SAO filtering can be optionally turned off or applied only on luma samples or only on chroma samples (regulated by slice_sao_luma_flag and slice_sao_chroma flag). SAO parameters can be either explicitly signaled in the CTU header or inherited from left or above CTUs.

As mentioned above, there are two types of SAO filtering:
Edge Type—offset depends on edge mode (signaled by SaoTypeIdx=2); and
Band Type—offset depends on the sample amplitude (SaoTypeIdx=1).

In the case of Edge Type, the edge is searched across one of the directions signaled by the value of the sao_eo_class parameter (=0, 1, 2, 3), as shown in FIGS. 14A-D, once per CTU 1400, 1402, 1404, 1406, wherein the sample labeled "p" indicates a current sample and the two samples labeled "n0" and "n1" specify two neighboring samples along the chosen direction.

Figure 15:
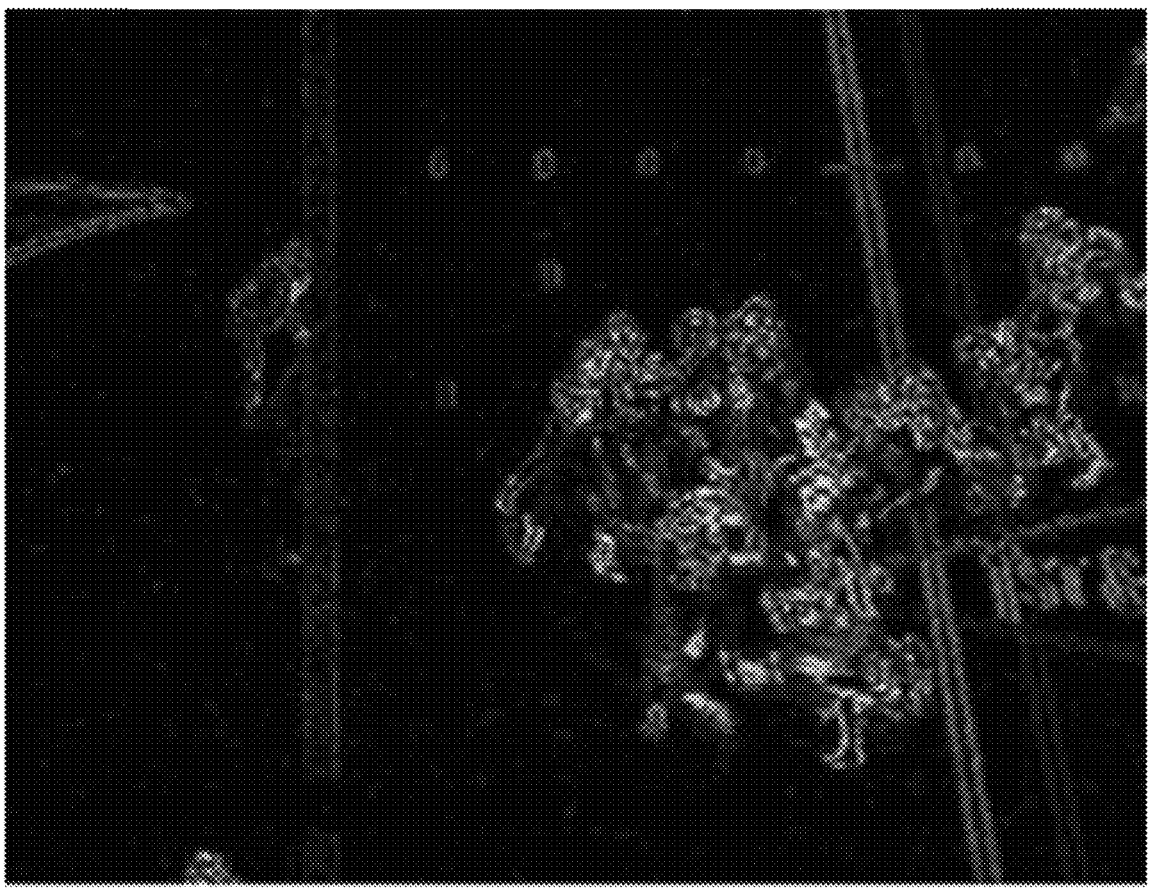
FIG. 15 is an image of a typical edge map detected by an edge operator.

The detected edge can come from an edge map using an edge detection operator (Canny edge detector operator is a non-limiting example). A typical edge map detected by an edge operator is shown in FIG. 15.

The edge detection is applied to each sample. According to the results, the sample is classified into five categories (EdgeIdx=0, 1, 2, 3, 4), as shown in FIG. 16, wherein each EdgeIdx has a corresponding condition with regard to the samples labeled "p", "n0" and "n1", and an associated meaning. For the EdgeIdx=0, the condition comprises p=n0 and p=n1, which has the meaning of "flat area"; for the EdgeIdx=1, the condition comprises p<n0 and p<n1, which has the meaning of "local min"; for the EdgeIdx=2, the condition comprises p<n0 and p=n1 or p<n1 and p=n0, which has the meaning of "edge"; for the EdgeIdx=3, the condition comprises p>n0 and p=n1 or p>n1 and p=n0, which has the meaning of "edge"; and for the EdgeIdx=4, the condition comprises p>n0 and p>n1, which has the meaning of "local max".

According to EdgeIdx, the corresponding sample offset (signaled by sao_offset_abs and sao_offset_sign) is added to the current sample. Up to 12 edge offsets (4 luma, 4 Cb chroma and 4 Cr chroma) are signaled per CTU.

Figure 17:
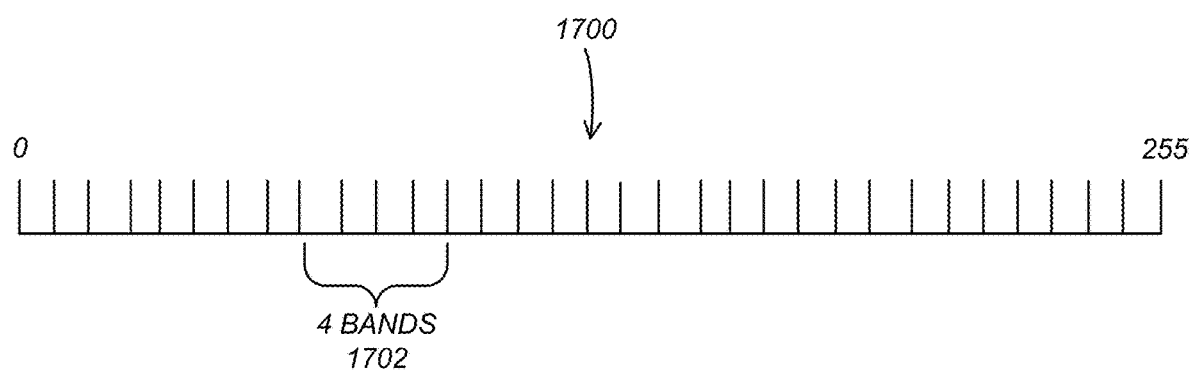
FIG. 17 shows an example of the four consecutive bands that are modified by adding the values denoted as band offsets.

Under the band offset method, the pixel range from 0 to 255 (for 8 bit depth) is uniformly split into 32 bands and the sample values belonging to four consecutive bands are modified by adding the values denoted as band offsets. FIG. 17 shows an example of the pixel range 1700 from 0 to 255 where four consecutive bands 1702 are modified by adding the values denoted as band offsets. The band offsets are signaled in the CTU header. Experimental results reveal that Band Type SAO is beneficial in noisy sequences or in sequences with large gradients.

Slices in HEVC

Figure 18:
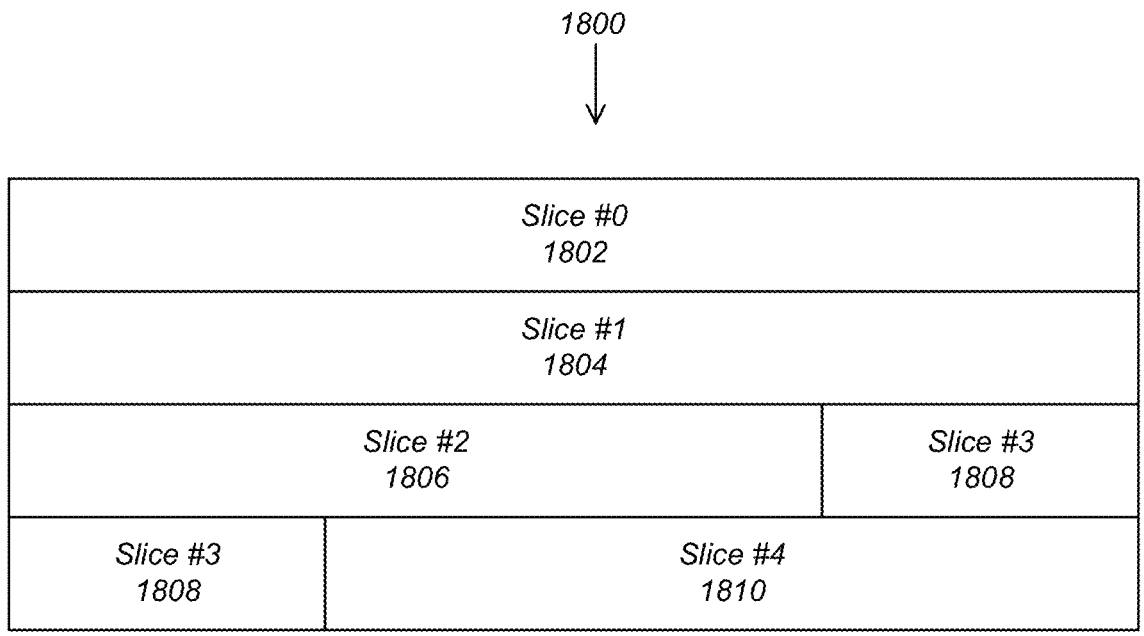
FIG. 18 illustrates the structure of slices in HEVC, wherein the slices are groups of CTUs in scan order, separated by a slice header.

FIG. 18 illustrates the structure 1800 of slices in HEVC, wherein the slices are groups of CTUs in scan order, separated by a start code (slice header). In this example, five slice partitions are shown, labeled as Slice #0 (1802), #1 (1804), #2 (1806), #3 (1808) and #4 (1810).

Generally, slices are used for:
network packetization (MTU size matching);
parallel processing (slices are self-contained, excepting deblocking), but the decoder has to perform some preprocessing to identify entry points; and
fast resynchronization in case of bitstream errors or packetloss.

Figure 19:
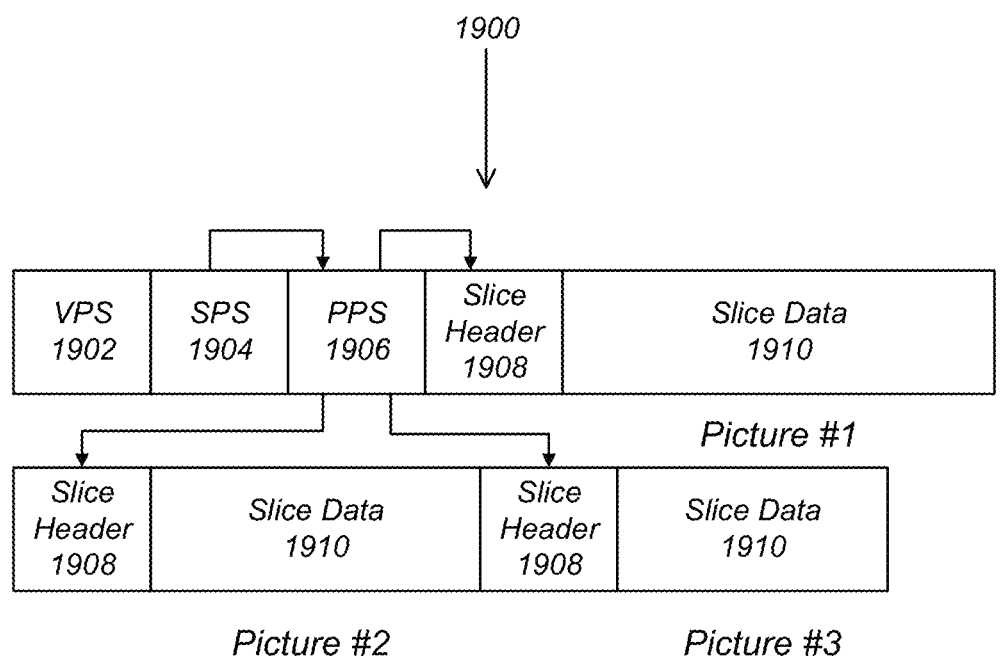
FIG. 19 illustrates the bitstream structure of HEVC that includes multiple slices.

FIG. 19 illustrates the bitstream structure 1900 of HEVC, wherein the NAL unit of the bitstream includes a VPS (1902), SPS (1904), and PPS (1906), followed by three instances of slice headers (1908) and slice data (1910) for Pictures #1, #2, #3. In this structure the SPS (1904) points at the PPS (1906), and the PPS (1906) points at each slice header (1908).

A slice comprises an integral number of CTBs or macroblocks. The number of CTBs in a slice is typically configured as a fixed number in most implementations. Alternatively, in some implementations, a slice can contain a varying integral number of CTBs with an approximately fixed number of bits. The number of bits in a slice is referred to as the slice width. This invention proposes a new method of slice width selection in the context of HEVC and compression/mosquito noise reduction.

As opposed to this characterization of slice width with regard to the gross video quality or noise, this invention uses a more nuanced approach. In the context of this invention:
1. The edge map is first detected. As noted above, many hardware-assisted primitives, including INTEL™ IPPs, are available as non-limiting examples for this step or function, and hence, the use of hardware-assisted primitives makes for low complexity implementations, and the complexity of this step can be expediently bounded. Example edge operators include Sobel, Prewitt, Canny, Difference of Gaussian, Laplacian or other edge operators.

Figure 20:
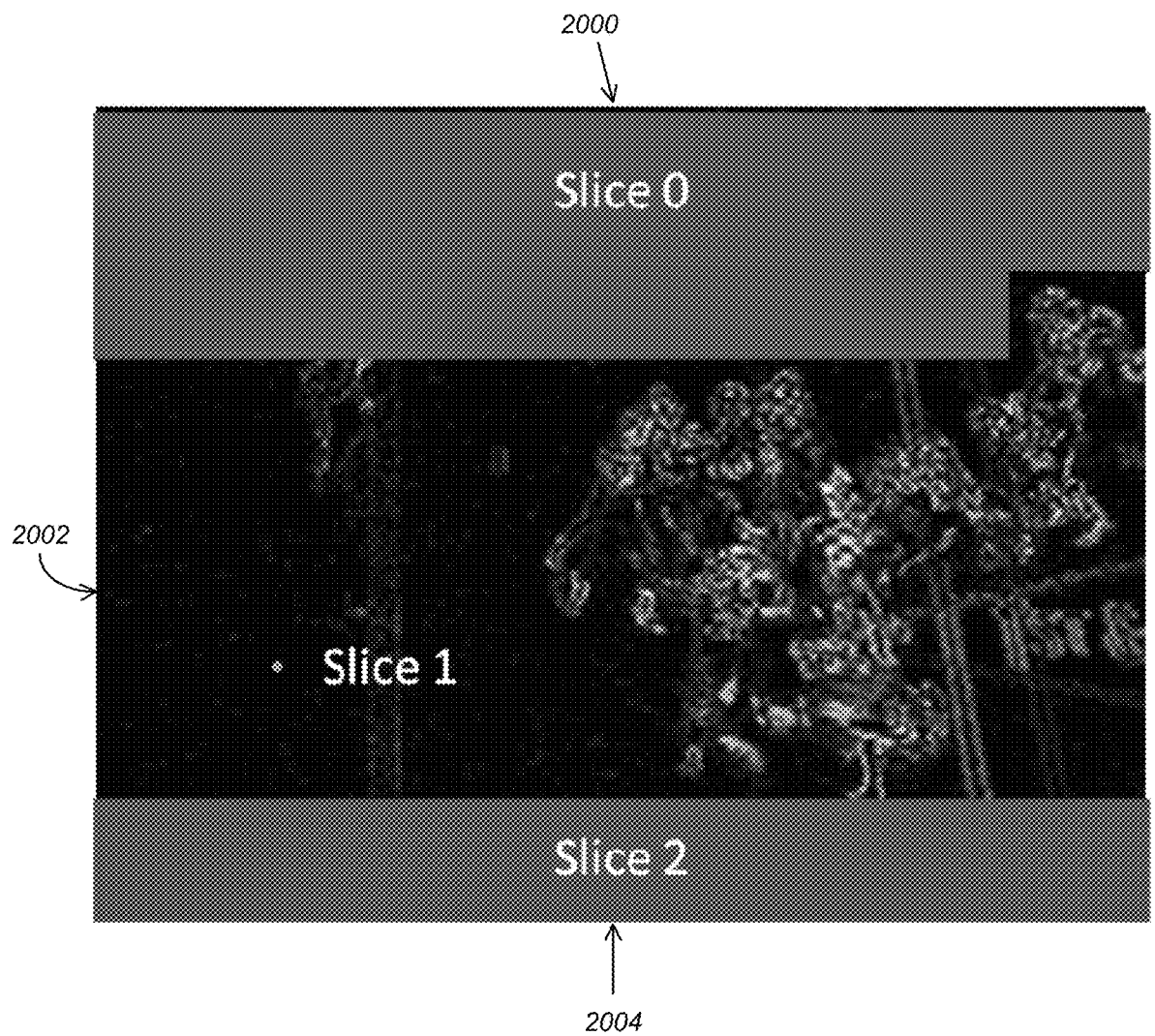
FIG. 20 illustrates multiple slices from FIG. 15 using adaptive slice widths.

2. Based on the edge map, the slice width may be chosen as depicted in FIG. 20.
3. SAO filtering is selectively turned on or off in the loop filter 322, based on the presence of an edge map or otherwise. A measure of how may edge pixels are present in a specific region can be used since, typically, regions would contain a few or many edges (rather than none of completely edge region). More advanced fuzzy classification methods can be used.

FIG. 20 illustrates Slice 0 (2000), Slice 1 (2002) and Slice 2 (2004) for the image from FIG. 15 using an adaptive slice width, wherein each slice has a different width. Note that Slice 1 (2002) has contiguous blocks having significant edge content and hence this invention turns SAO filtering on for only Slice 1 (2002) in this figure. This saves encoding complexity and compression efficiency for Slice 0 (2000) and Slice 2 (2004), while Slice 1 (2002) gets reduced mosquito noise around the moving edges, by virtue of SAO filtering being turned on.

Formation of Slices

The edge map basically tags each block either as an edge-block or non-edge block. FIG. 21 is an example edge map 2100, based on FIG. 20, that shows different arrangements and orientations of edge-blocks and non-edge-blocks in a frame, wherein edge-blocks are labeled as "E", while non-edge-blocks are labeled as "N".

The edge (E) blocks within the boundary lines of 2102 (i.e., beginning at row 3, column 13 through row 7, column 14) satisfy the conditions to form an edge slice comprised of only edge blocks that are contiguous, as well as more than the threshold required to form a slice. These blocks correspond to Slice 1 in FIG. 20.

The edge (E) blocks outside the boundary lines of 2102 (i.e., beginning at row 1, column 1 through row 3, column 12, and beginning at row 8, column 1 through row 9, column 14) do not satisfy the conditions to form a complete slice that is comprised of only edge blocks, either because they are isolated, or in some cases contiguous, but too few in number, and hence below the threshold required to form an edge slice. These blocks correspond to Slice 0 (i.e., beginning at row 1, column 1 through row 3, column 12) and Slice 2 (i.e., beginning at row 8, column 1 through row 9, column 14) in FIG. 20.

Slice 1 is formed first as a complete slice that is comprised only of edge-blocks. After formation of Slice 1, the remaining blocks are aggregated into contiguous regions of blocks. A slice needs to have a contiguous region of blocks; hence, the aggregation yields two regions for slices (apart from Slice 1 already formed). Thus, the result is Slice 0 and Slice 2, respectively. Note that other slice formation methods may be used for the non-edge slices (for example, based on a selected slice width for such non-edge slices).

The following describes a method for forming the exclusive slices with edge-blocks, according to one embodiment.
1. At the beginning of each frame, a toggle flag is initialized to off and a counter is initialized to 0.
2. Pass 1—"Get Count Data"
   Loop L—Each of the blocks in a frame is then traversed in a raster scan.
   Step A—"Count Blocks in Each Run"
      As each block is encountered, if there is a transition from non-edge to edge, a toggle flag is turned on. Each edge-block increments a counter.
      When there is a transition to a non-edge-block, the counter's value is saved to an indexed list of counter values associated with the contained blocks traversed in the run. (Each run of contiguous edge-blocks, that is, the run of edge-blocks encountered since the toggle flag was turned on, is saved as a separate indexed list entry of the counter's vale and associated blocks). The counter is then reset to 0 and the toggle flag is turned off.
   The logic returns to step A, until all blocks of the frame are processed by Loop L.
3. Pass 2—"Form Slices"
   A minimum threshold for blocks within a slice is selected, e.g., N.
   Each of the list entries in the indexed list of counter values is examined. If the counter value is greater than N, a slice is formed by the blocks associated with that list entry. Note that N has an implication on the number of slices in the frame and can be chosen accordingly. For example, if the total number of blocks in the frame is B, and it is decided that there should be no more than 5 slices per frame, then N=B/S can be selected.
   All the eligible runs which exceed N are formed as slices. These are slices associated with edge-blocks for which SAO filtering is turned on.
   Each group of remaining blocks in between the eligible slices are aggregated into a slice. Since there may be multiple such groups in a frame, there could be multiple such slices of non-edge-blocks, for which SAO filtering is then turned off. Note that other slice formation methods may apply for the non-edge slices (for example, based on a selected slice width for such non-edge slices).

Figure 22A:
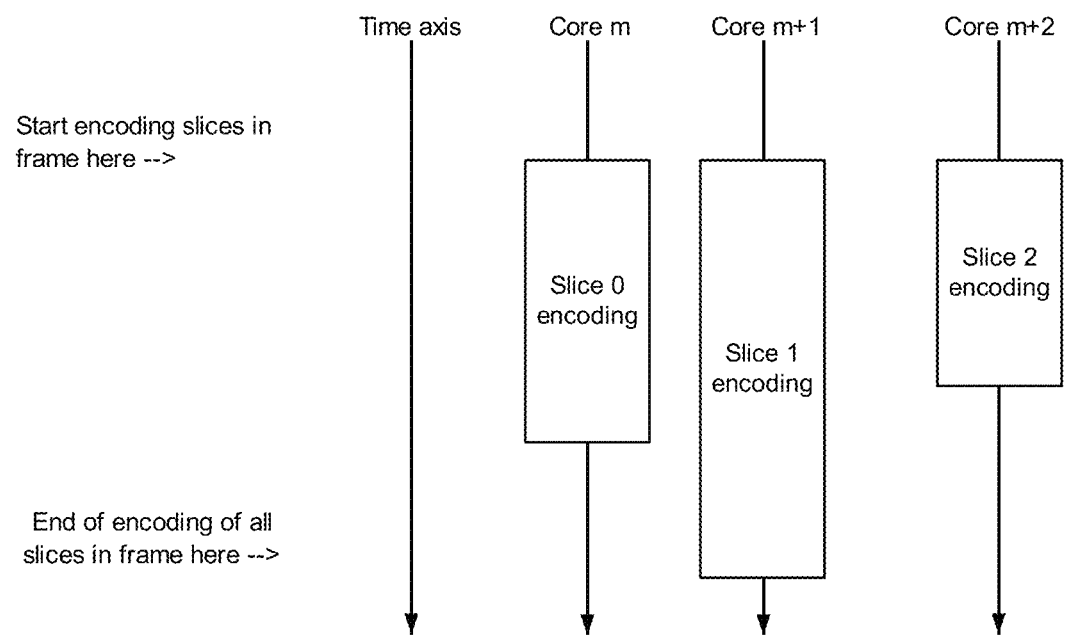
FIGS. 22A-B are non-limiting examples of how some embodiments of the invention would work on processors with multicore architectures.
Figure 22B:
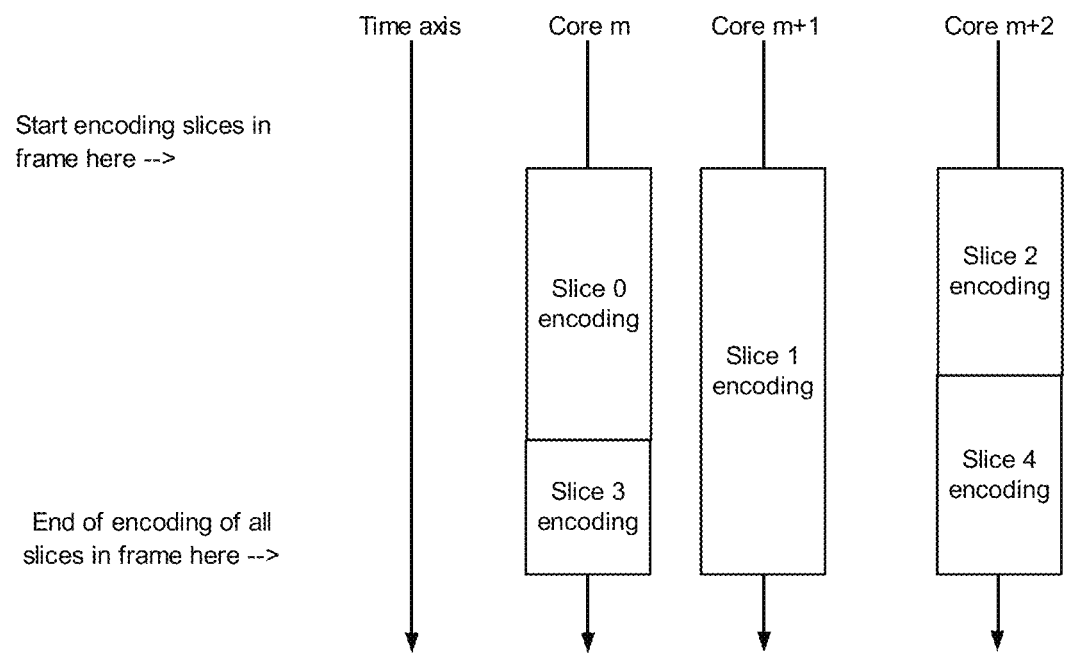

FIGS. 22A-22B are non-limiting examples of how some embodiments of the invention would work on processors with multicore architectures.

FIG. 22A shows how the different slices are associated with different free cores available in an example timing diagram. Specifically, Slice 0 is associated with core m, Slice 1 is associated with core m+1, and Slice 2 is associated with core m+2. Note that, in the case where there are fewer cores than slices to be encoded, the number of blocks contained in each slice can be used to effectively load-balance the cores.

FIG. 22B shows a different timing diagram for a frame that has additional slices. Specifically, Slice 0 is associated with core m, Slice 1 is associated with core m+1, Slice 2 is associated with core m+2, Slice 3 is associated with core m, and Slice 4 is associated with core m+2. In this example, cores m and m+2 handle multiple slices in the time that core m+1 handles the largest slice, Slice 1. Effective task scheduling mechanisms can ensure good parallelism among cores using different type of parallelization strategies.

Guidance on the SAO Filter to be Used

As noted above, the focus of this invention is to partition the video frames into slices in order to turn SAO filtering on for selected slices. The following steps can provide guidance on the SAO filter to be used.
1. The edges may show discontinuities or breaks, due to the different strengths of edges. Short edges can be aggregated into extended edges using some parametric techniques. Hough transform can be used to parametrically identify line edges with different angular orientations.
2. Using these detected and processed edges, a histogram of edges is created for the edges with each block, that is, for each coding tree block (CTB). Each histogram bin sums up the strength of pixels with similar edge direction in the CTB using the processed edges. The histogram bin with a maximum strength indicates there is a strong edge along this direction in the CTB and, hence, is considered as the likely edge offset type.
3. The SAO parameters for each CTB are comprised of SAO mode, SAO type and four offsets. SAO type can be SAO_TYPE_EO_0,_90,_135 and _45, and one band offset SAO_TYPE_BO. Since there are four bins for edge offsets, the processed edges are clustered into the closest bin, out of the said four bins.

Thus, based on the distribution of the edge direction histogram, only one Edge Offset class is chosen for further encoding process.

Experimental Results

Figure 23B:
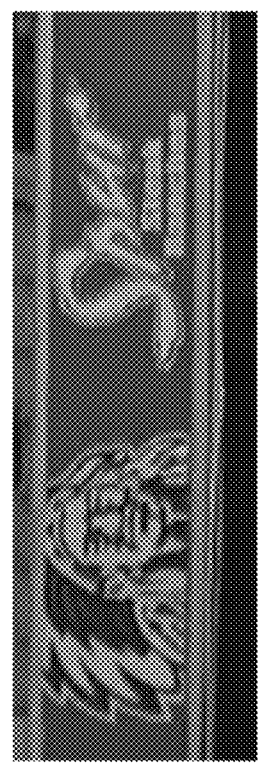
FIGS. 23A-B illustrate the differences in quality resulting from this invention.
Figure 23A:
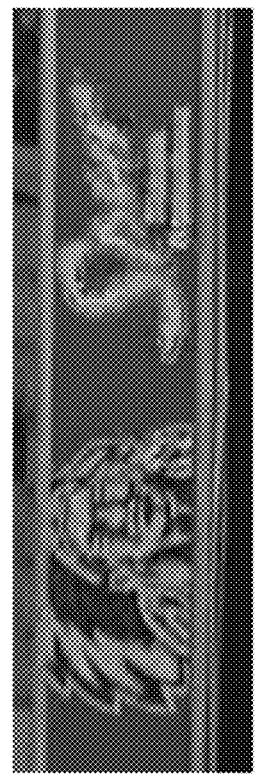

Using edge-based processing, experimental results should that improvements were obtained using the invention. Specifically, FIGS. 23A and 23B illustrate the difference in quality resulting from this invention, wherein FIG. 23B is of higher quality (i.e., less mosquito noise around the edges) as compared to FIG. 23A. In order to ensure that non-edge block regions did not deteriorate, the PSNR-bitrate curves were monitored and it was ensured there was no degradation due to the processing applied under this invention.

Hardware Environment

Figure 24:
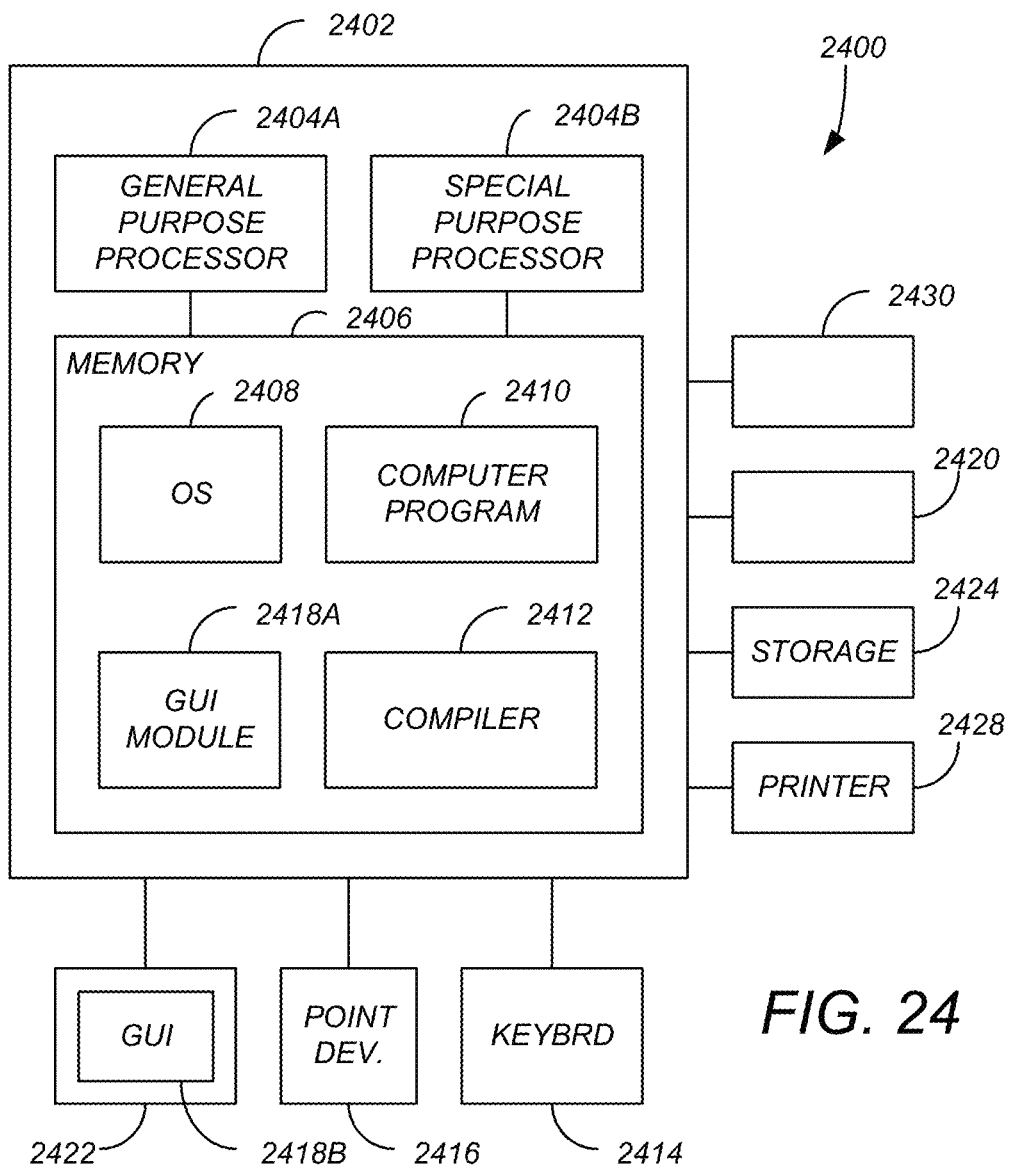
FIG. 24 is a diagram illustrating an exemplary computer system 2200 that could be used to implement elements of the present invention.

FIG. 24 is a diagram illustrating an exemplary computer system 2400 that could be used to implement elements of the present invention, including some or all of the elements of the codec system 200A. The exemplary computer system 2400 may also be used to encode the uncoded video 102 according to the selected encoding parameters or to decode the coded video.

The computer 2402 comprises a general purpose hardware processor 2404A and/or a special purpose hardware processor 2404B (hereinafter alternatively collectively referred to as processor 2404) and a memory 2406, such as random access memory (RAM). The computer 2402 may be coupled to other devices, including input/output (I/O) devices such as a keyboard 2414, a mouse device 2416 and a printer 2428.

In one embodiment, the computer 2402 operates by the general purpose processor 2404A performing instructions defined by the computer program 2410 under control of an operating system 2408. The computer program 2410 and/or the operating system 2408 may be stored in the memory 2406 and may interface with the user and/or other devices to accept input and commands and, based on such input and commands and the instructions defined by the computer program 2410 and operating system 2408 to provide output and results.

Output/results may be presented on the display 2422 or provided to another device for presentation or further processing or action. In one embodiment, the display 2422 comprises a liquid crystal display (LCD) having a plurality of separately addressable pixels formed by liquid crystals. Each pixel of the display 2422 changes to an opaque or translucent state to form a part of the image on the display in response to the data or information generated by the processor 2404 from the application of the instructions of the computer program 2410 and/or operating system 2408 to the input and commands. Other display 2422 types also include picture elements that change state in order to create the image presented on the display 2422. The image may be provided through a graphical user interface (GUI) module 2418A. Although the GUI module 2418A is depicted as a separate module, the instructions performing the GUI functions can be resident or distributed in the operating system 2408, the computer program 2410, or implemented with special purpose memory and processors.

Some or all of the operations performed by the computer 2402 according to the computer program 2410 instructions may be implemented in a special purpose processor 2404B. In this embodiment, some or all of the computer program 2410 instructions may be implemented via firmware instructions stored in a read only memory (ROM), a programmable read only memory (PROM) or flash memory within the special purpose processor 2404B or in memory 2406. The special purpose processor 2404B may also be hardwired through circuit design to perform some or all of the operations to implement the present invention. Further, the special purpose processor 2404B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 2402 may also implement a compiler 2412 which allows an application program 2410 written in a programming language such as COBOL, C, C++, FORTRAN, or other language to be translated into processor 2404 readable code. After completion, the application or computer program 2410 accesses and manipulates data accepted from I/O devices and stored in the memory 2406 of the computer 2402 using the relationships and logic that was generated using the compiler 2412.

The computer 2402 also optionally comprises an external communication device such as a modem, satellite link, Ethernet card, or other device for accepting input from and providing output to other computers.

In one embodiment, instructions implementing the operating system 2408, the computer program 2410, and/or the compiler 2412 are tangibly embodied in a computer-readable medium, e.g., data storage device 2420, which could include one or more fixed or removable data storage devices, such as a zip drive, floppy disc drive 2424, hard drive, CD-ROM drive, tape drive, or a flash drive. Further, the operating system 2408 and the computer program 2410 are comprised of computer program instructions which, when accessed, read and executed by the computer 2402, causes the computer 2402 to perform the steps necessary to implement and/or use the present invention or to load the program of instructions into a memory, thus creating a special purpose data structure causing the computer to operate as a specially programmed computer executing the method steps described herein. Computer program 2410 and/or operating instructions may also be tangibly embodied in memory 2406 and/or data communications devices 2430, thereby making a computer program product or article of manufacture according to the invention. As such, the terms "article of manufacture," "program storage device" and "computer program product" or "computer readable storage device" as used herein are intended to encompass a computer program accessible from any computer readable device or media.

Of course, those skilled in the art will recognize that any combination of the above components, or any number of different components, peripherals, and other devices, may be used with the computer 2402.

Although the term "computer" is referred to herein, it is understood that the computer may include portable devices such as cellphones, portable MP3 players, video game consoles, notebook computers, pocket computers, or any other device with suitable processing, communication, and input/output capability.

Processor Steps or Functions

Figure 25:
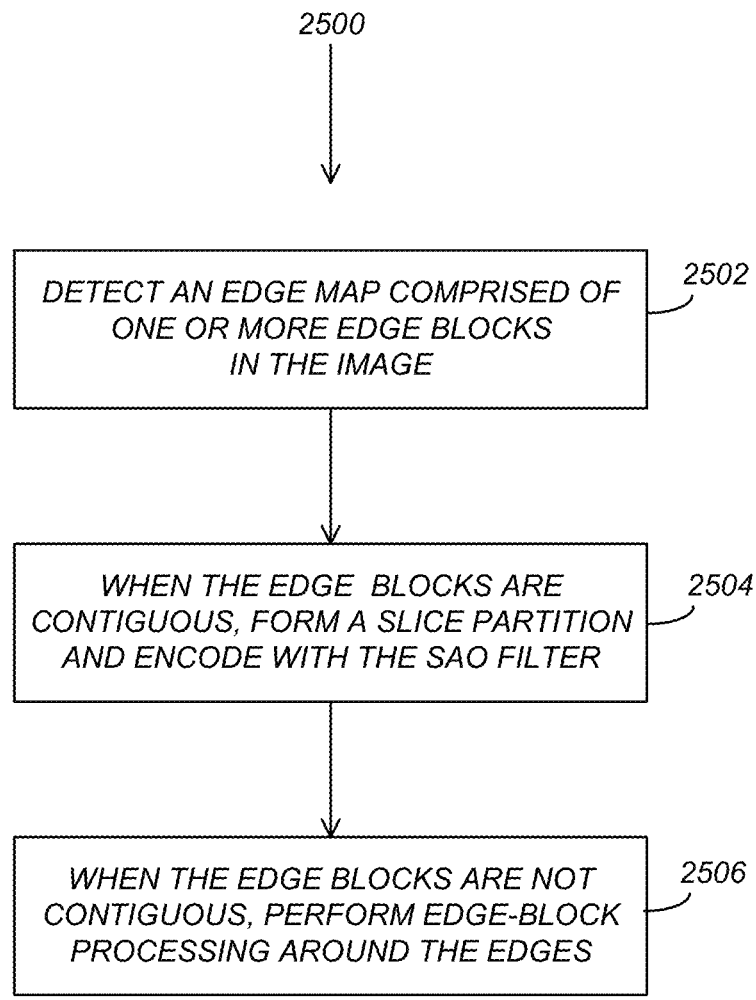
FIG. 25 is a flowchart illustrating the steps or functions performed by a processor, according to one embodiment.

FIG. 25 is a flowchart illustrating the steps or functions 2500 performed by a processor, according to one embodiment. Specifically, these steps and functions are performed by the elements of the codec system 200A when encoding a frame of video.

Block 2502 represents a processor detecting an edge map comprised of one or more edge-blocks in the frame. The edge map is detected by an edge operator. The edge map is detected by classification of pixels in the frame as edges or non-edges, and by classification of blocks as edge-blocks or non-edge-blocks based on the classification of the pixels. Specifically, the edge map is detected by a gradient or differences computation in a pixel domain of the frame, wherein a lower threshold and a higher threshold are used on the gradient or differences computation in order to generate the edge map, wherein the lower threshold and the higher threshold are used on a number of edge pixels per individual block to classify the individual block as one of the edge-blocks or one of the non-edge-blocks, and wherein the lower and higher threshold are scaled based on the individual block's size used during the encoding for decisions within the individual block.

Block 2504 represents a processor, when the edge-blocks are contiguous, forming at least one slice partition using the edge-blocks and encoding the slice partition using a sample adaptive offset (SAO) filter. The slice partition is formed with an adaptive slice width, and the sample adaptive offset (SAO) filter is turned on or off during the encoding based on whether the edge-blocks are being encoded.

Block 2506 represents a processor, when the edge-blocks are not contiguous, performing edge-block processing around edges in the frame during encoding of the edge-blocks. The edge-block processing involves configuring one or more of: an intra block size, a transform block size, an inter prediction block size, a quantization parameter, candidate modes for intra prediction, pyramid level for motion estimation, and fractional pixel motion estimation search.

Conclusion

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching.

It is intended that the scope of the invention be limited not by this detailed description, but rather by the claims appended hereto. The above specification, examples and data provide a complete description of the manufacture and use of the apparatus and method of the invention. Since many embodiments of the invention can be made without departing from the scope of the invention, the invention resides in the claims hereinafter appended.

What is claimed is:

1. A method of encoding frames of video, comprising:
   (a) processing blocks in the frames to classify the blocks as being edge blocks or non-edge blocks, constructing edge maps for respective said edge blocks of said frames, based upon the respective edge maps (i) forming at least one first slice partitioning having a size so as to enclose contiguous edge blocks, and (ii) forming at least one second slice partitioning having a size so as to enclose non-contiguous edge blocks;
   (b) encoding blocks in the at least one first slice partition using a sample adaptive offset (SAO) filter;
   (c) encoding blocks in the at least one second slice partition by performing edge-block processing around edges in the second slice partition, without applying a SAO filter to edge blocks in the second partition;
   (d) wherein the SAO filter is disabled while encoding the at least one second slice partition.

2. The method of claim 1, wherein the slice partition is formed with an adaptive slice width.

3. The method of claim 1, wherein the at least one slice partition comprises a plurality of slice partitions and the plurality of slice partitions are processed in parallel.

4. The method of claim 1, wherein the edge map is detected by an edge operator.

5. The method of claim 1, wherein the edge map is detected by classification of pixels in the frame as edges or non-edges, and by classification of blocks as edge-blocks or non-edge-blocks based on the classification of the pixels.

6. The method of claim 5, wherein the edge map is detected by a gradient or differences computation in a pixel domain of the frame.

7. The method of claim 6, wherein a lower threshold and a higher threshold are used on the gradient or differences computation in order to generate the edge map.

8. The method of claim 7, wherein the lower threshold and the higher threshold are used on a number of edge pixels per individual block to classify the individual block as one of the edge-blocks or one of the non-edge-blocks.

9. The method of claim 8, wherein the lower and higher threshold are scaled based on the individual block's size used during the encoding for decisions within the individual block.

10. The method of claim 1, wherein the edge-block processing involves configuring one or more of: an intra block size, a transform block size, an inter prediction block size, a quantization parameter, candidate modes for intra prediction, pyramid level for motion estimation, and fractional pixel motion estimation search.

* * * * *

UNITED STATES PATENT AND TRADEMARK OFFICE
CERTIFICATE OF CORRECTION

| | |
|---|---|
| PATENT NO. | : 11,470,311 B2 |
| APPLICATION NO. | : 17/099012 |
| DATED | : October 11, 2022 |
| INVENTOR(S) | : Shailesh Ramamurthy, Padmassri Chandrashekar and Anil Kumar Nellore |

Page 1 of 1

It is certified that error appears in the above-identified patent and that said Letters Patent is hereby corrected as shown below:

In the Specification

Column 13, Line 35: Replace "VT" with --$V_T$--

Column 13, Line 41: Replace "VT" with --$V_T$--

Column 13, Line 53: Replace "VT" with --$V_T$--

Signed and Sealed this
Thirteenth Day of August, 2024

Katherine Kelly Vidal
*Director of the United States Patent and Trademark Office*